(12) United States Patent
Adams

(10) Patent No.: US 12,427,005 B2
(45) Date of Patent: Sep. 30, 2025

(54) HAND HELD DENTAL FLOSSING DEVICE AND METHOD OF OPERATING THE SAME

(71) Applicant: Mark Adams, Arlington, WA (US)

(72) Inventor: Mark Adams, Arlington, WA (US)

( * ) Notice: Subject to any disclaimer, the term of this patent is extended or adjusted under 35 U.S.C. 154(b) by 0 days.

(21) Appl. No.: 18/977,991

(22) Filed: Dec. 12, 2024

(65) Prior Publication Data

US 2025/0107874 A1 Apr. 3, 2025

Related U.S. Application Data

(63) Continuation-in-part of application No. 18/394,692, filed on Dec. 22, 2023.

(51) Int. Cl.
*A61C 15/04* (2006.01)
(52) U.S. Cl.
CPC .................... *A61C 15/048* (2013.01)
(58) Field of Classification Search
CPC .... A61C 15/046; A61C 15/047; A61C 15/048
USPC ........................................ 132/323, 324, 325
See application file for complete search history.

(56) References Cited

U.S. PATENT DOCUMENTS

| | | | | |
|---|---|---|---|---|
| 2,146,375 A * | 2/1939 | Landis | ................ | A61C 15/046 132/326 |
| 2,381,530 A * | 8/1945 | Dembenski | .......... | A61C 15/046 132/325 |
| 2,707,782 A * | 5/1955 | Eby | ...................... | A61C 15/046 132/326 |
| 3,340,881 A * | 9/1967 | Cowan | ................. | A61C 15/046 132/325 |
| 3,534,745 A * | 10/1970 | Waters | ................. | A61C 15/047 D28/68 |
| 4,005,721 A * | 2/1977 | Yasumoto | ............ | A61C 15/048 132/325 |
| 5,232,002 A * | 8/1993 | McClallen | ........... | A61C 15/046 132/324 |
| 7,637,267 B2 * | 12/2009 | Chang | ................. | A61C 15/046 132/323 |
| 2010/0139689 A1 * | 6/2010 | Couch | .................. | A61C 15/047 132/325 |

* cited by examiner

*Primary Examiner* — Thomas C Barrett
*Assistant Examiner* — Jennifer P Connell
(74) *Attorney, Agent, or Firm* — Novel Patent Services LLC

(57) ABSTRACT

A hand-held dental flossing device facilitates a user guide, control feed and tension of the dental floss during the flossing of teeth. The hand-held dental flossing device comprises a body having a handle, a head with plurality of arms, and a floating platform. The plurality of arms comprises closed loops to facilitate a passage of a dental floss. The floating platform comprises a first spool, and a second spool. The first spool could unwind the dental floss for discharging upon rotation by a user. The second spool is adapted to wind a used portion of the dental floss upon rotation of the first spool and the second spool simultaneously by the user. The hand-held dental flossing device enables the user to control the tension of the dental floss at various modes by operating the first and second spools.

14 Claims, 23 Drawing Sheets

HAND HELD DENTAL FLOSSING DEVICE AND METHOD OF OPERATING THE SAME

FIELD OF THE INVENTION

The present disclosure relates generally to the field of oral hygiene, and more particularly to a hand-held dental flossing device that is provided with a floating platform, which facilitates a user guide, control feed and tension of a the dental floss during the flossing of teeth.

BACKGROUND

Dental flossing process is an important part of oral hygiene. The dental flossing process uses dental floss to remove plaque and food particles between teeth, where your toothbrush can't reach. Plaque is a sticky film of bacteria that can build up on your teeth and cause cavities and gum disease. The dental floss helps in preventing cavities, gum disease, and bad breath.

The use of the dental floss is considered to be of great importance in the exercise of healthy dental hygiene. Dentists recommend at least daily use of the dental floss in conjunction with brushing to promote healthy teeth and gums. Because of the difficulty and discomfort of flossing the teeth, many flossing devices have been developed in the prior art.

A first class of such prior art devices includes non-motorized flossing stationary flossing devices. For example, the dental cleansing device shown in U.S. Pat. No. 5,094,256 to Barth ("Barth") includes a fork-shaped device having two arms extending from the distal end of a shaft. One end of a length of dental floss is fastened to the shaft. From the shaft, the floss is strung through an aperture in one arm, through an aperture in a second, and strung down to and fastened to the shaft at the other end. The floss is strung tightly between the two fastening points to provide a tight length of floss between the arms of the device. The user then holds the operative end of the shaft and positions the tight length of the shaft between the abutting teeth. The user causes cleansing action to take place by moving the shaft in a reciprocating manner, which movement is directly translated to the floss.

The drawback of this and similar devices is that only a small length of the floss between the arms is available for cleansing at any one time and gets dirty, stretches and worn quickly, requiring constant restringing. Furthermore, the floss is more likely to shred and break, and the reciprocating motion of the arms within the mouth can cause the arms to hit and irritate the gums and cheeks.

Various dental floss holders have been developed to facilitate holding and tensioning the dental floss and to facilitate the urging of dental floss between the teeth. Although in the prior art some dental floss holders were of disposable design, reusable dental floss holders utilizing commonly available dental floss are more often cost-effective. Of the currently more popular reusable dental floss holders, which are of low-cost construction and use widely available dental floss, most have a pair of spaced arms at the end of a supporting handle. A length of dental floss is strung between the ends of the spaced arms, which have floss-receiving notches at their terminal ends.

The dental floss holders have only limited success commercially for a number of reasons, often including inadequate securing and/or tensioning of the dental floss, a design not easily maneuvered in the back of the mouth, a design wasteful of dental floss, and/or a design with too much bulk and discomfort in use. Further, some prior art dental floss holders that use commonly available dental floss material require tie-down, knotting, loop-making, or other special treatment of one or both of the dental floss ends.

While these dental floss holders may be suitable for the particular purpose they address, they are not as suitable for allowing an individual to floss their teeth with only one hand and without positioning their fingers within their mouth during flossing. Conventional dental floss devices are difficult to utilize and require both hands to properly operate.

Therefore, there is a need for a hand-held dental flossing device that is provided with a floating platform, which facilitates a user guide control feed and tension of the floss during the flossing process. There is also a need for a hand-held dental flossing device that uses a non-linear spring, which facilitates the user in setting different tension levels of the floss. There is also a need for a hand-held dental flossing device that is simple to load and replace with one or more spools. There is also a need for a hand-held dental flossing device that provides the ability to compensate for any stretching of the floss around a closed loop. There is also a need for a hand-held dental flossing device that maintains constant tension on the floss while feeding a new segment of floss. There also a need for a hand-held dental flossing device that can be operated by using a single hand.

SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key nor critical elements of all embodiments, nor delineate the scope of any or all embodiments.

The present disclosure, in one or more embodiments, relates to a hand-held dental flossing device that is provided with a floating platform, which facilitates a user guide to control feed and tension of the dental floss during the flossing of teeth.

In one embodiment herein, the hand-held dental flossing device comprises a body, a head, and a floating platform. In one embodiment herein, the body having a handle. In specific, the handle having at least one of straight, curved or U-shaped structures. In specific, the handle is solid or split. The handle is configured to provide grip to the user for holding while using the hand-held dental flossing device. The handle comprises a scale, which facilitates the user to adjust the tension of the dental floss at various levels. The various modes of the hand-held dental flossing device include a minimum tension mode, a nominal tension mode, and a maximum tension mode.

In one embodiment herein, the head with plurality of arms pivotally affixed to an end of the handle. In specific, the plurality of arms comprises one or more closed loops to facilitate a passage of a dental floss, which is used for flossing of teeth. In specific, the plurality of arms is made of at least one material includes stainless-steel. The plurality of arms is coated with silicone, which provides comfort to the user during the flossing of teeth.

In one embodiment herein, the floating platform is configured to movably position to the handle through an axle, thereby providing support for the floating platform by the handle. The floating platform comprises a case member, a first spool and a second spool.

In one embodiment herein, the case member is defining a chamber. In one embodiment herein, the first spool is rotatably mounted on the axle at one side within the chamber. The first spool is configured for only unwinding the dental floss for dispensing unused floss upon rotation by a user. In one embodiment herein, the first spool filled is with unused floss and equipped with a unidirectional control to permit only unwinding or dispensing of unused floss. In one embodiment herein, the second spool is rotatably mounted on the axle at another side within the chamber. The second spool is adapted to secure a free end of the dental floss received from the first spool through the one or more closed loops and wind a used portion of the dental floss upon rotation of the first spool and the second spool simultaneously by the user.

The first spool and the second spool are rotatably connected to each other on the axle through a clutch system, thereby controlling the tension of the dental floss at the head where the user flossing the teeth upon rotation of the first spool and the second spool, respectively. In specific, the clutch system is connected to a ratchet pawl, which is used to limit rotational motion of the at least one of the first spool and the second spool in a direction while setting the tension of the dental floss. In particular, the clutch system may also incorporate a spring-loaded pin within the handle that engages a circular teeth pattern on the side of the first spool or the second spool, to allow ratcheting and restrict rotation to a unidirectional mode. In particular, each of the first spool and the second spool comprise a knurled disc, which facilitates the user to rotate and hold the first spool and the second spool. The knurled disc of the first spool and the second spool is protruded from the case member.

The floating platform is adapted to move through the handle towards the head against an elastic member mounted on an outer surface of the handle when the user increasing and decreasing the tension of the dental floss at the head by rotating the second spool and holding the first spool, and by rotating the first spool and holding the second spool. The floating platform comprises a clip fastener, which is configured to hold the first spool, the clutch system, and the second spool together on the axle by applying pressure on both sides of the floating platform. The clip fastener is configured to apply an engagement force on the clutch system, thereby allowing turning or slipping torque within an acceptable range, and is sufficient to provide the predictable slippage force without additional spring mechanisms.

In one embodiment herein, the floating platform is detachably positioned to the handle, thereby allowing the user to simply load and replace the first spool with the dental floss and the second spool. The elastic members that are configured to provide and maintain a constant tension of the dental floss at the head of the hand-held dental flossing device, thereby preventing tangling of the dental floss. The elastic members are non-linear springs.

An embodiment of the first aspect, the invention provides a method for operating the hand-held dental flossing device for flossing of teeth. At one step, the user rotates the knurled disc of the first spool and the second spool for discharging a length of the dental floss from the first spool and guiding the dental floss to the second spool through the head for performing flossing of teeth.

At another step, the user controls the tension of the dental floss by moving the floating platform towards the head against the elastic member when the user increases and decreases the tension of the dental floss by rotating the second spool and holding the first spool, and by rotating the first spool and holding the second spool, respectively.

Further, at another step, the hand-held dental flossing device enables the user to control the tension of the dental floss at various modes by operating the first spool and the second spool, thereby maintaining constant tension of the dental floss and preventing the dental floss from tangling, sagging and shredding during flossing of teeth.

In another embodiment herein, the hand-held dental flossing device comprises a body, a head, and a floating platform. The body includes a handle configured with a split or solid structure at one end and a palm rest at another end. The handle is ergonomically designed to provide a secure grip for the user during dental flossing operations. The handle also includes a scale to facilitate the user in adjusting the tension of the dental floss with distinct levels, such as minimum, nominal, and maximum tension, to accommodate different flossing preferences.

In one embodiment herein, the head is affixed to one end of the handle and comprises a plurality of arms. The each arm of the plurality of arms comprises one or more closed loops, which are configured to guide the passage of dental floss, which is used for flossing teeth during the dental flossing operations. The plurality of arms is made of stainless steel and coated with silicone to enhance comfort and prevent irritation during flossing operations. The design of the head is optimized with an angle for improved maneuverability, particularly in hard-to-reach areas of the user's mouth and the head is optimized to minimize friction and avoid significant loss of dental floss tension during use.

In one embodiment herein, the floating platform having a holding member is configured to slidably position within the handle. The floating platform comprises a case member defining a chamber, a first spool, and a second spool. The floating platform facilitates efficient dental flossing by enabling the controlled unwinding and winding of dental floss while maintaining consistent tension.

In one embodiment herein, the first spool is rotatably mounted within the chamber and comprises a primary worm gear profile. The primary worm gear profile is configured to engage with a first worm that is rotatably mounted on one side of the axle shaft that protrudes outward through the handle, and rotated manually by a user for unwinding the dental floss. In one embodiment, the second spool is configured to receive used dental floss and rotatably mounted within the chamber and includes a secondary worm gear teeth profile. The second spool is adapted to engage with the second worm for winding the used dental floss onto the second spool. In one embodiment herein, the second worm is rotatably mounted on another side of the axle shaft.

In one embodiment herein, a pair of clutches is mounted on the axle shaft on both sides while aligning with the first worm and the second worm. The pair of clutches includes a primary clutch and a secondary clutch. The primary clutch is connected to the first spool via the first worm, allowing the unwinding of new dental floss when engaged. Similarly, the secondary clutch is connected to the second spool via the second worm, enabling the winding of used dental floss when engaged.

In one embodiment herein, at least one flexible spring positioned over the axle shaft on both sides, thereby positioning between the primary clutch and a bushing member affixed to one end of the first worm, and between the secondary clutch and another bushing member affixed to one end of the second worm, thereby exerting a restoring force to facilitate controlled engagement and of the pair of clutches and enabling controlled slipping under predetermined torque conditions, and enabling the user to independently control the rotation of the first spool and the second spool while rotating the first worm and hold the second worm, respectively.

In one embodiment herein, the floating platform is adapted to move through the handle and the head against an elastic member mounted within the handle. The elastic member is flexibly mounted within the handle and is configured such that the user either increases the tension of the dental floss at the head by rotating the second worm at the second spool while holding the first worm stationary at the first spool, or decreases the tension by rotating the first worm at the first spool while holding the second worm stationary at the second spool. The elastic member ensures constant tension of the dental floss during use, thereby preventing tangling, sagging or shredding of the floss. In one embodiment herein, the elastic member is a non-linear spring. The first spool and the second spool are configured to rotate in same directions on a common axel when clutches are not slipping, with rotation defined as clockwise from the user's perspective facing the device, thereby dispensing the dental floss by the first spool and collecting the dental floss by the second spool, and facilitating simultaneous winding and unwinding of the dental floss for performing the dental flossing operations efficiently.

In one embodiment herein, the floating platform is detachably positioned within the handle. This detachable configuration, thereby allowing for easy loading and replacement of the first spool and the second spool by removing the entire floating platform in the relaxed state of the elastic member. The floating platform incorporates bank winding techniques to ensure consistent floss tension consistent floss tension by compensating for varying wind diameters of the dental floss, where one spool is fully wound while the other is empty, resulting in disparate wound floss diameters and mean floss lengths. It is the wind diameter, rather than the spool diameter, that introduces positional errors, which the floating platform cancels out to maintain consistent tension. The floating platform is configured to allow the user to adjust the tension of the dental floss by manipulating the handle and engaging the elastic member. Additionally, the first spool and the second spool are mounted horizontally to optimize the device's profile, enhance user comfort, and ensure smooth operation of the dental floss.

In one embodiment herein, the hand-held dental flossing device comprises low-friction micro-pulleys positioned at critical bend points near the head. These micro-pulleys reduce friction during flossing and help maintain consistent tension, even with thicker or waxed dental floss types. The head is also designed to minimize friction and loss of tension, improving the overall user experience.

In one embodiment herein, the primary clutch and the secondary clutch are adapted to facilitate tension release by slipping under controlled conditions by rotating the first worm and holding the second worm to release or decrease the tension of the dental floss, thereby facilitating easy removal and replacement of the first spool and the second spool. This functionality facilitates easy removal and replacement of the first spool and the second spool. If no floss remains on the first spool and the elastic member is still engaged, the floss must be cut to relax the elastic member, thereby enabling the spools to be repositioned and replaced easily. The secondary clutch is configured to operate in a unidirectional mode, thereby preventing the reverse winding of used dental floss back onto the first spool, thereby ensuring efficient and hygienic operation. In one embodiment herein, the pair of clutches are slipper clutches, which are used to limit rotational motion of at least one of the first spool or the second spool in a direction while setting the tension of the dental floss.

An embodiment of a second aspect, the invention provides a method for operating the hand-held dental flossing device. At one step, the user rotates the first worm, which is mounted on the axle shaft and connected to the first spool. This action dispenses a length of new dental floss from the first spool. The dental floss is guided through the plurality of arms, passing through the micro pulleys at the head of the hand-held dental flossing device, and is collected onto the second spool. This setup facilitates uninterrupted flossing during dental operations.

At another step, the user engages the primary clutch. This engagement allows the unwinding of the dental floss from the first spool by rotating the first worm, while the second worm remains stationary, thereby ensuring precise floss dispensing and maintaining appropriate tension.

At another step, the user engages the secondary clutch. This enables the winding of used dental floss onto the second spool by rotating the second worm while keeping the first worm stationary, effectively collecting the used dental floss.

At another step, the user adjusts the floss tension at the head for optimal performance by rotating the first worm at the first spool in the clockwise direction to decrease the tension while holding the second worm stationary or rotating the second worm at the second spool in the clockwise direction to increase the tension while holding the first worm stationary. Both the first worm and the second worm share a common axle, and when the pair of clutches are not slipping, both the first worm and the second worm turn in tandem in the same clockwise direction, with the first spool dispensing floss and the second spool collecting floss.

At another step, the user actuates the secondary clutch to facilitate rotation in the unidirectional mode by rotating the second worm at the second spool in one direction. The unidirectional control, independent of the clutch action, restricts the first spool and the second spool to rotate only in the clockwise direction from the user's perspective facing the device, thereby ensuring that the used dental floss does not rewind back onto the first spool maintains hygienic operation and preventing floss tangling during use.

Finally, the user relaxes the tension of the dental floss by holding the second worm until enough floss is dispensed to bring the tension to zero, as the primary clutch and the secondary clutch slip under controlled conditions. If the first spool is empty, the user must cut the floss to relax the elastic member, thereby enabling the elastic member to return to its relaxed state. This facilitates the easy removal and replacement of the first spool for new dental floss and the second spool for used dental floss.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

The accompanying drawings, which are incorporated in and constitute a part of the specification, illustrate an embodiment of the invention, and, together with the description, explain the principles of the invention.

DETAILED DESCRIPTION

Figure 1A:
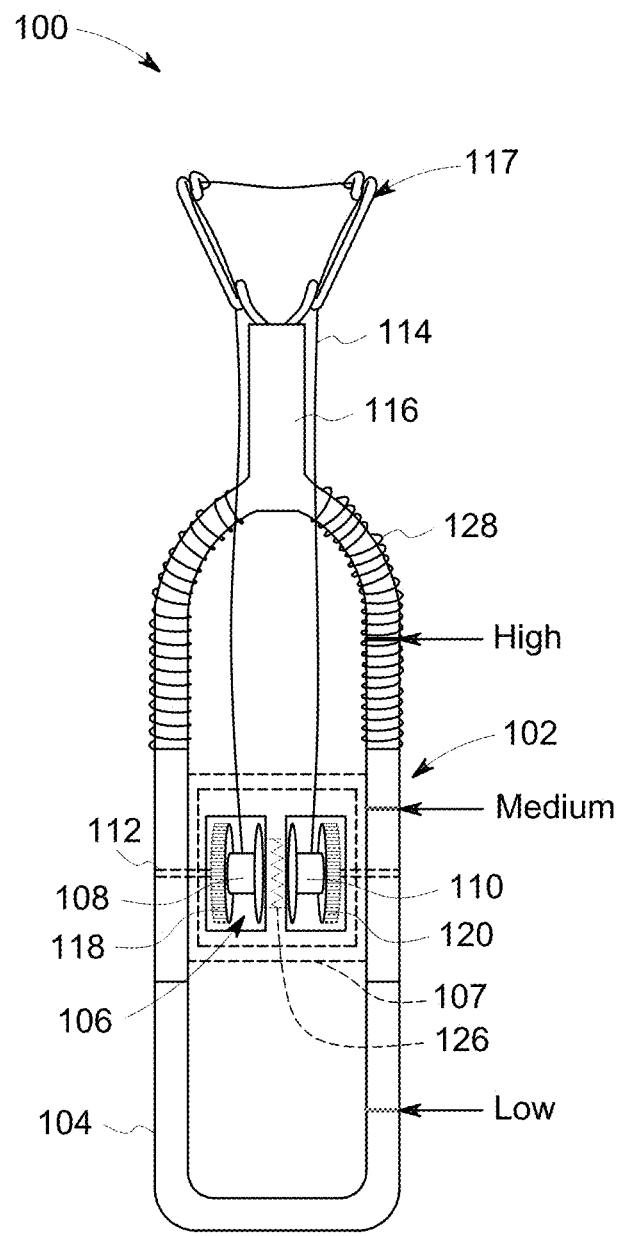
FIG. 1A illustrates a top view of a hand-held dental flossing device, in accordance with embodiments of the invention.

Reference will now be made in detail to the present preferred embodiments of the invention, examples of which are illustrated in the accompanying drawings. Wherever possible, the same reference numerals are used in the drawings and the description to refer to the same or like parts.

FIG. 1A refers to a top view of a hand-held dental flossing device 100. The hand-held dental flossing device 100 is provided with a floating platform 106, which facilitates a user guide, control the feed and tension of the dental floss 114 during the flossing process. The hand-held dental flossing device 100 that uses a non-linear spring, which facilitates the user in setting different tension levels of the dental floss 114. The hand-held dental flossing device 100 is simple to load and replace with one or more spools. The hand-held dental flossing device 100 provides the ability to compensate for any stretching of the dental floss 114 around a closed loop. The hand-held dental flossing device 100 maintains constant tension on the dental floss 114 while feeding a new segment of the dental floss 114. The hand-held dental flossing device 100 can be operated by using a single hand.

In one embodiment herein, the hand-held dental flossing device 100 comprises a body 102, a head 116, and a floating platform 106. In one embodiment herein, the body 102 is provided with a handle 104. In some embodiments herein, the handle 104 having at least one of straight, curved or U-shaped structures. In specific, the handle 104 having a U-shaped structure. In one embodiment herein, the handle 104 comprises a scale, which facilitates the user to adjust the tension of the dental floss 114 at various levels (high, medium, low). The various modes of the hand-held dental flossing device 100 include a minimum tension mode, a nominal tension mode, and a maximum tension mode.

In one embodiment herein, the head 116 with plurality of arms 117 pivotally affixed to an end of the handle 104. In one embodiment herein, the handle 104 is a solid or split-handle. The handle 104 is configured to provide grip to the user for holding while using the hand-held dental flossing device 100. The plurality of arms 117 comprises one or more closed loops to facilitate a passage of a dental floss 114, which is used for flossing of teeth. In one embodiment herein, the plurality of arms 117 is made of at least one material includes stainless-steel. The plurality of arms 117 is coated with silicone, which provides comfort to the user during the flossing of teeth.

In one embodiment herein, the floating platform 106 is configured to movably position to the handle 104 through an axle 112, thereby providing support for the floating platform 106 by the handle 104. The first spool 108 and the second spool 110 are rotatably connected to each other on the axle 112 through a clutch system 126 The floating platform comprises a case member 107 defining a chamber, a first spool 108, and a second spool 110. The first spool is rotatably mounted on the axle 112 at one side within the chamber. The first spool 108 is configured for winding and unwinding the dental floss 114 for discharging upon rotation by a user.

In one embodiment herein, the floating platform 106 is detachably positioned to the handle 104, thereby allowing the user to simply load and replace the first spool 108 with the dental floss 114 and the second spool 110.

In one embodiment herein, the second spool 110 is rotatably mounted on the axle 112 at another side within the chamber. The second spool 110 is adapted to secure a free end of the dental floss 114 received from the first spool 108 through the one or more closed loops and wind a used portion of the dental floss 114 upon rotation of the first spool 108 and the second spool 110 simultaneously by the user.

In one embodiment herein, each of the first spool 108 and the second spool 110 comprise a knurled disc (118, 120), which facilitates the user to rotate and hold the first spool 108 and the second spool 110. Each of the knurled disc (118, 120) of the first spool 108 and the second spool 110 is protruded from the case member 107.

In one embodiment, the floating platform 106 is adapted to move through the handle 104 towards the head 116 against an elastic member 128 mounted on an outer surface of the handle when the user increasing and decreasing the tension of the dental floss 114 at the head 116 by rotating the second spool 110 and holding the first spool 108, and by rotating the first spool 108 and holding the second spool 110. In one embodiment herein, the elastic members 128 are configured to provide and maintain a constant tension of the dental floss 114 at the head 116 of the hand-held dental flossing device 100, thereby preventing tangling of the dental floss 114, the elastic members 128 are non-linear springs. When the elastic members 128 are fully extended in a relaxed state the floating platform 106 is farthest away from the head 116. At this point the tension of the dental floss 114 will be low. When the elastic members 128 are fully compressed and the floating platform 106 is closest to the head 116, then the tension of the dental floss 114 will be the high. The hand-held dental flossing device 100 enables the user to control the tension of the dental floss 114 at various modes by operating the first spool 108 and the second spool 110.

Figure 1B:
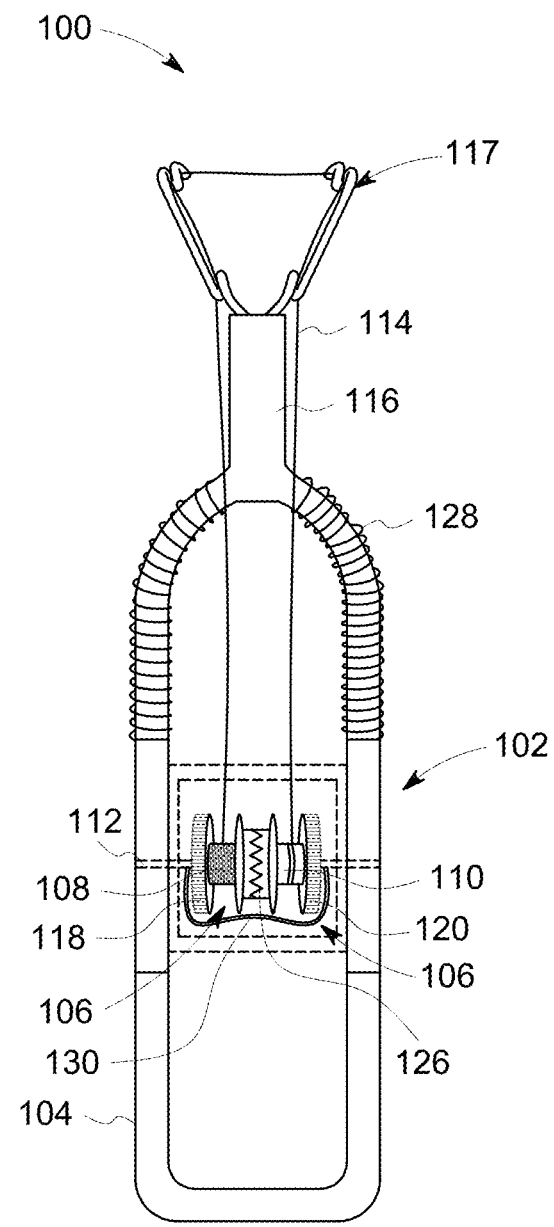
FIG. 1B illustrates a bottom view of the hand-held dental flossing device, in accordance with embodiments of the invention.

FIG. 1B refers to a bottom view of the hand-held dental flossing device 100. In one embodiment herein, each of the first spool 108 and the second spool 110 comprise a knurled disc (118, 120), which facilitates the user to rotate and hold the first spool 108 and the second spool 110. Each of the knurled disc (118, 120) of the first spool 108 and the second spool 110 is protruded from the case member 107.

In one embodiment herein, the first spool 108 and the second spool 110 are rotatably connected to each other on the axle 112 through a clutch system 126, thereby controlling a tension of the dental floss 114 at the head 116 where the user flossing the teeth upon rotation of the first spool 108 and the second spool 110, respectively.

The floating platform 106 comprises a clip fastener 130, which is configured to hold the first spool 108, the clutch system 126, and the second spool 110 together on the axle 112 by applying pressure on both sides of the floating platform 106. In one embodiment herein, the clutch system 126 is a slipper clutch. The clip fastener 130 is configured to apply an engagement force on the clutch system 126, thereby allowing turning or slipping torque within an acceptable range. The clutch system 126 is connected to a ratchet pawl 127 (as shown in FIG. 3B), which is used to limit rotational motion of the at least one of the first spool 108 and the second spool 110 in a direction while setting the tension of the dental floss 114. The ratchet pawl 127 is configured to prevent the user from winding the used dental floss 114 back on to the first spool 108.

Figure 2:
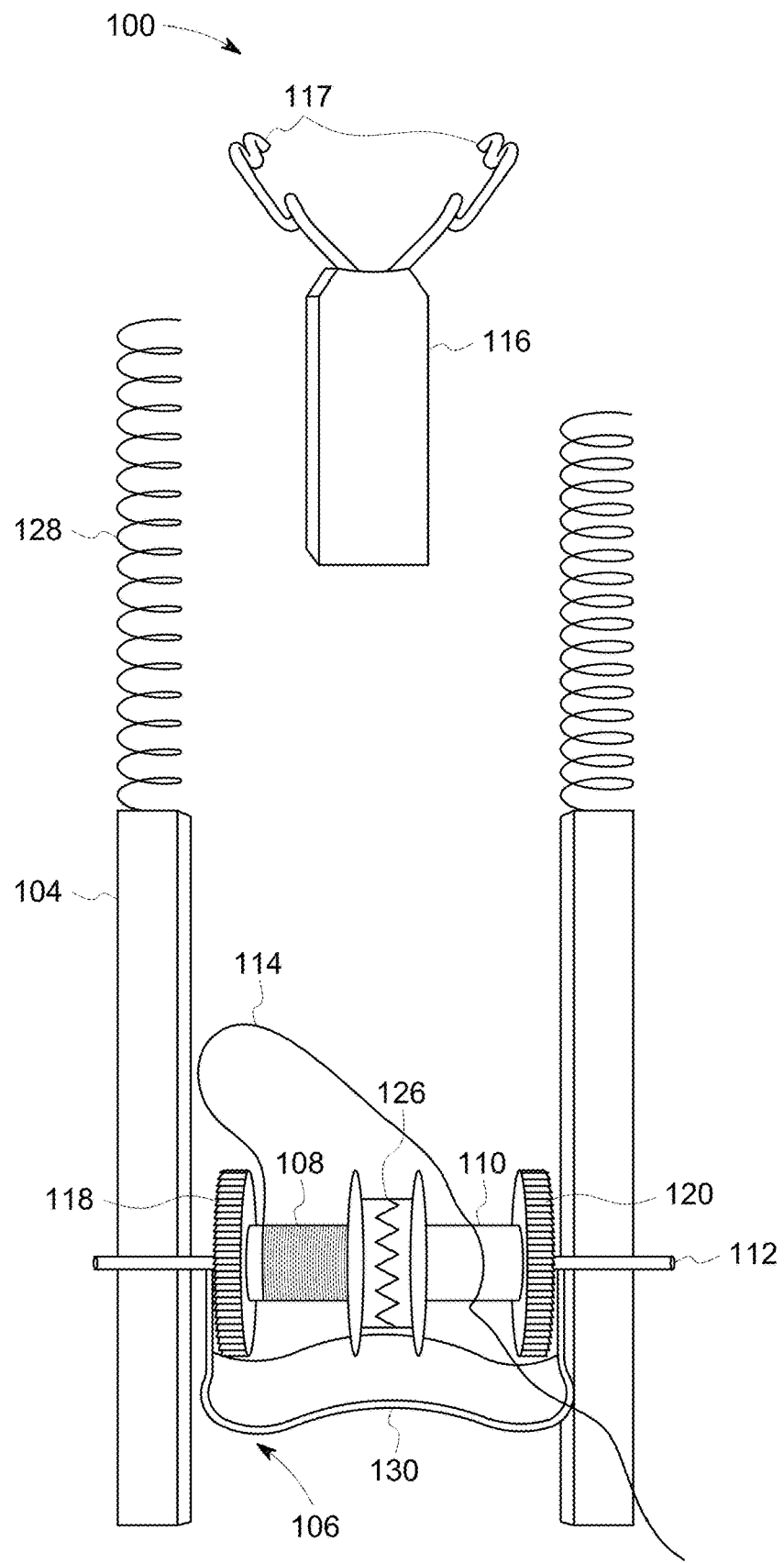
FIG. 2 illustrates an exploded view of the hand-held dental flossing device, in accordance with embodiments of the invention.

FIG. 2 refers to an exploded view of the hand-held dental flossing device 100. In one embodiment herein, the case member 107 on the floating platform 106 is opened and the used spools are removed and recycled/discarded. The floating platform 106 contains the first spool 108 having the dental floss 114 and the second spool 110 where the used dental floss 114 will reside. The first spool 108 is configured dispense the dental floss 114 and the second spool 110 is configured to collect the used dental floss 114. The dental floss 114 is partially attached to the second spool 110 that is empty. Next a short length of the dental floss 114 is pulled from the first spool 108 towards the head 116 and guided into the plurality of arms 117 on each side of the head 116. Piglet mechanism is used for securing the dental floss 114 in all directions of pull.

After feeding the dental floss 114 from the first spool 108, the user is ready to adjust the tension of the dental floss 114. The user adjusts the tension of the dental floss 114 by grabbing and holding the at least one knurled disc 118 of the first spool 108 to prevent further dispensing and turning the at least one knurled disc 120 of the second spool 110 in at least one direction (clockwise from the user's perspective facing the hand-held dental flossing device 100) to wind the dental floss 114 and increase tension, as the first spool 108 dispense the dental floss 114 when rotated and remains stationary when held.

In one embodiment herein, the hand-held dental flossing device 100 is operated and controlled by the user manually by the hand, where palm and outer fingers of the hand hold the body 102, and center fingers of the hand hold the floating platform 106. The tension of the dental floss 114 is controlled by the user's hand during the flossing process. While flossing the teeth, the pulling action increases the tension of the dental floss 114 giving the user full control feeling. The hand-held dental flossing device 100 allows the user to use frequently and the hand-held dental flossing device 100 enables the user to load and replace the first and second spools (108, 110) easily.

Figure 3A:
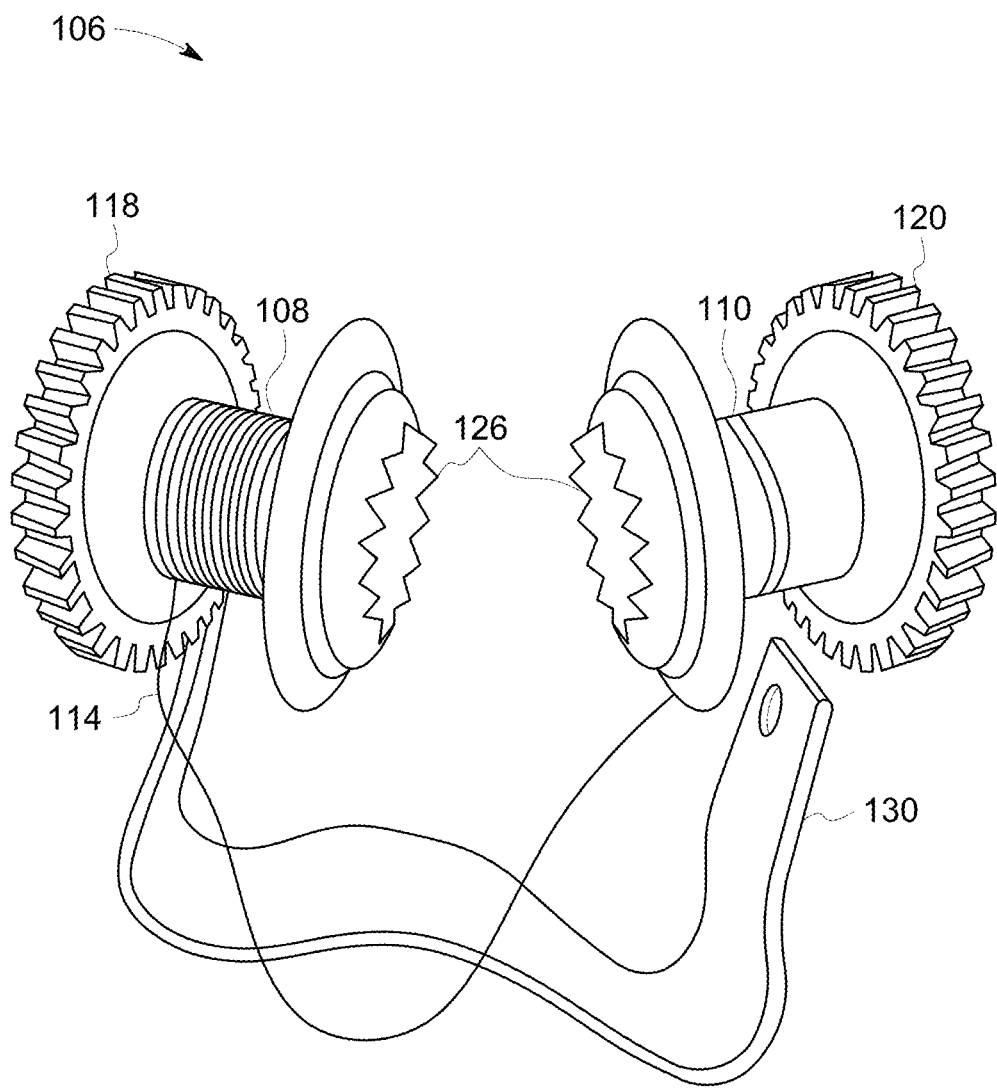
FIG. 3A illustrates a detailed view of a floating platform of the hand-held dental flossing device, in accordance with embodiments of the invention.
Figure 3B:
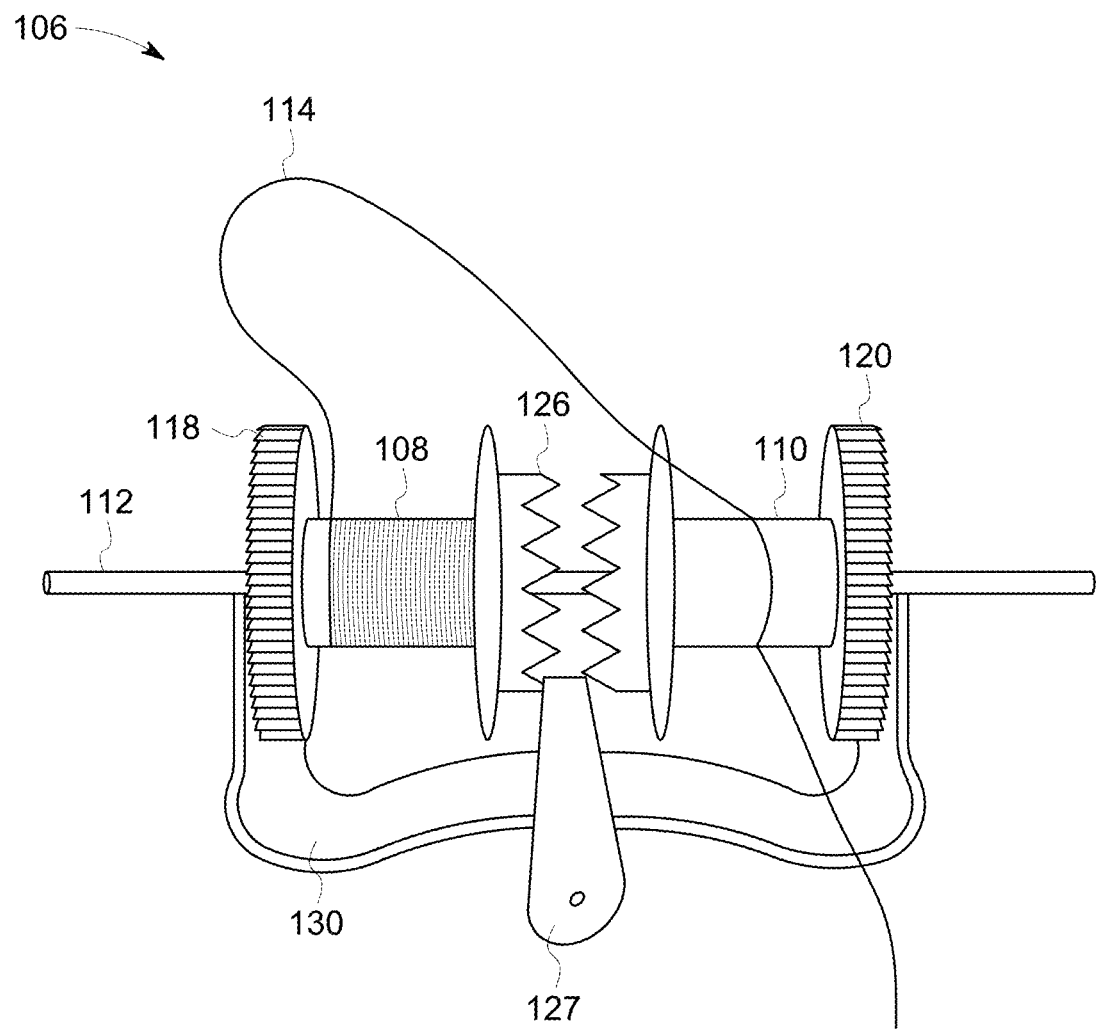
FIG. 3B illustrates a schematic view of the floating platform of the hand-held dental flossing device, in accordance with embodiments of the invention.

FIG. 3A refers to a detailed view of the floating platform 106 of the hand-held dental flossing device 100. In one embodiment herein, the knurled disc (118, 120) of the first spool 108 and the second spool 110 will protrude through the case member 107 that protects or hides the first spool 108 and the second spool 110 allowing the user to grip the top and bottom of each knurled disc (118, 120), thereby permitting easy turning to the knurled disc (118, 120) of the first spool 108 and the second spool 110.

FIG. 3B refers to schematic view of the floating platform 106 of the hand-held dental flossing device 100. In one embodiment herein, the floating platform 106 has the ability to take out any stretching of the dental floss 114 and prevents tangling, sagging and shredding of the dental floss 114 in order to maintain a constant tension. The first spool 108 and the second spool 110 are rotatably connected to each other on the axle 112 through the clutch system 126, thereby controlling a tension of the dental floss 114 at the head 116 where the user flossing the teeth upon rotation of the first spool 108 and the second spool 110, respectively. In one embodiment herein, the clutch system 126 is the slipper clutch the clutch system 126 is connected to the ratchet pawl 127, which is used to limit rotational motion of the at least one of the first spool 108 and the second spool 110 in a direction while setting the tension of the dental floss 114.

Figure 4A:
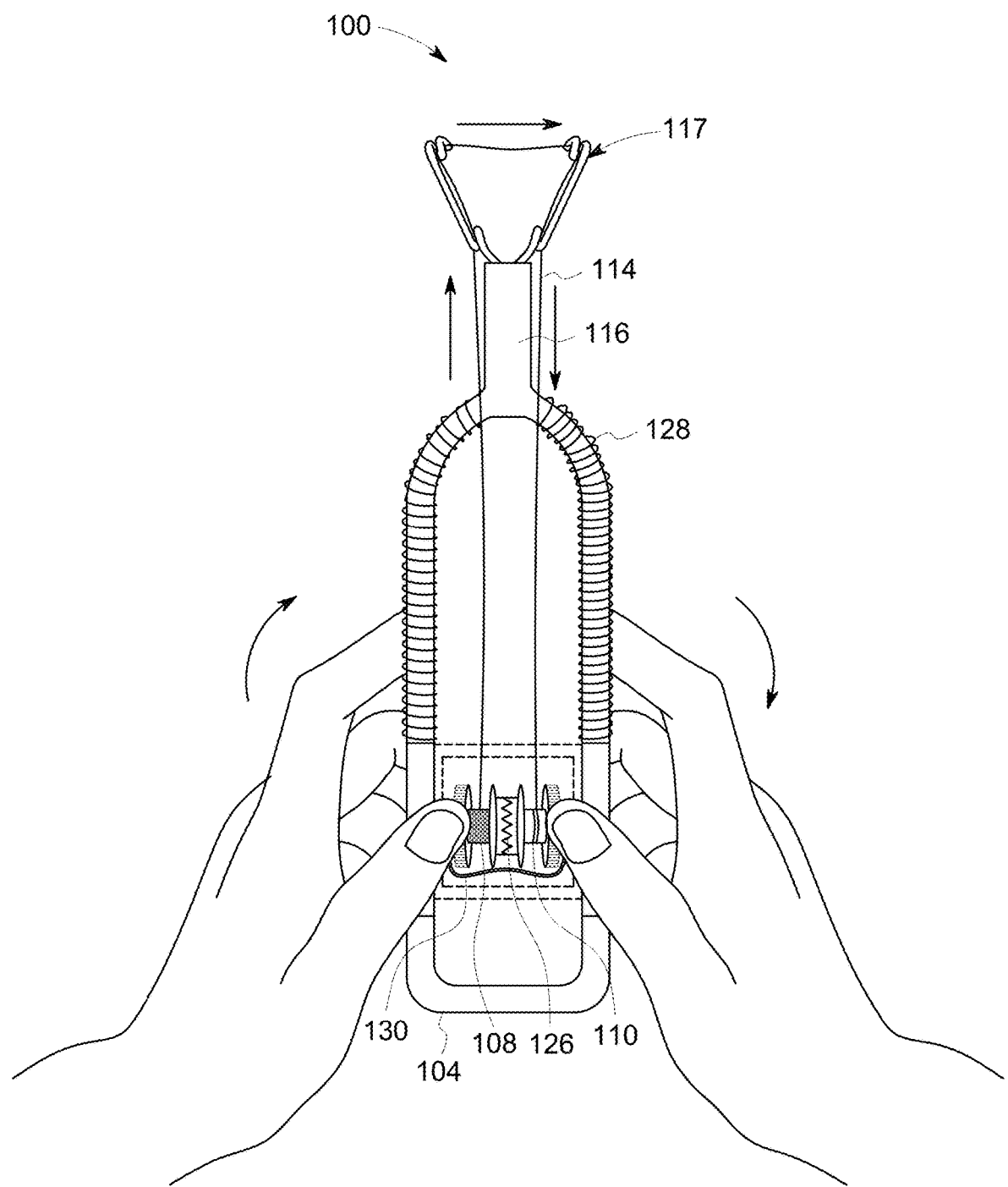
FIG. 4A illustrates a schematic view of the hand-held dental flossing device dispensing new dental floss when operated by a user, in accordance with embodiments of the invention.

FIG. 4A refers to a schematic view of the hand-held dental flossing device 100 dispensing new dental floss 114 when operated by the user. In one embodiment herein, the user rotates the first spool 108 and the second spool 110 together, then the dental floss 114 at the head 116 is changed with a new dental floss. The length of the dental floss 114 dispensed from the first spool 108 is equal to the dental floss 114 removed from the second spool 110. The tension of the dental floss 114 is maintained constantly during the flossing of teeth by rotating the first spool 108 and the second spool 110.

Figure 4B:
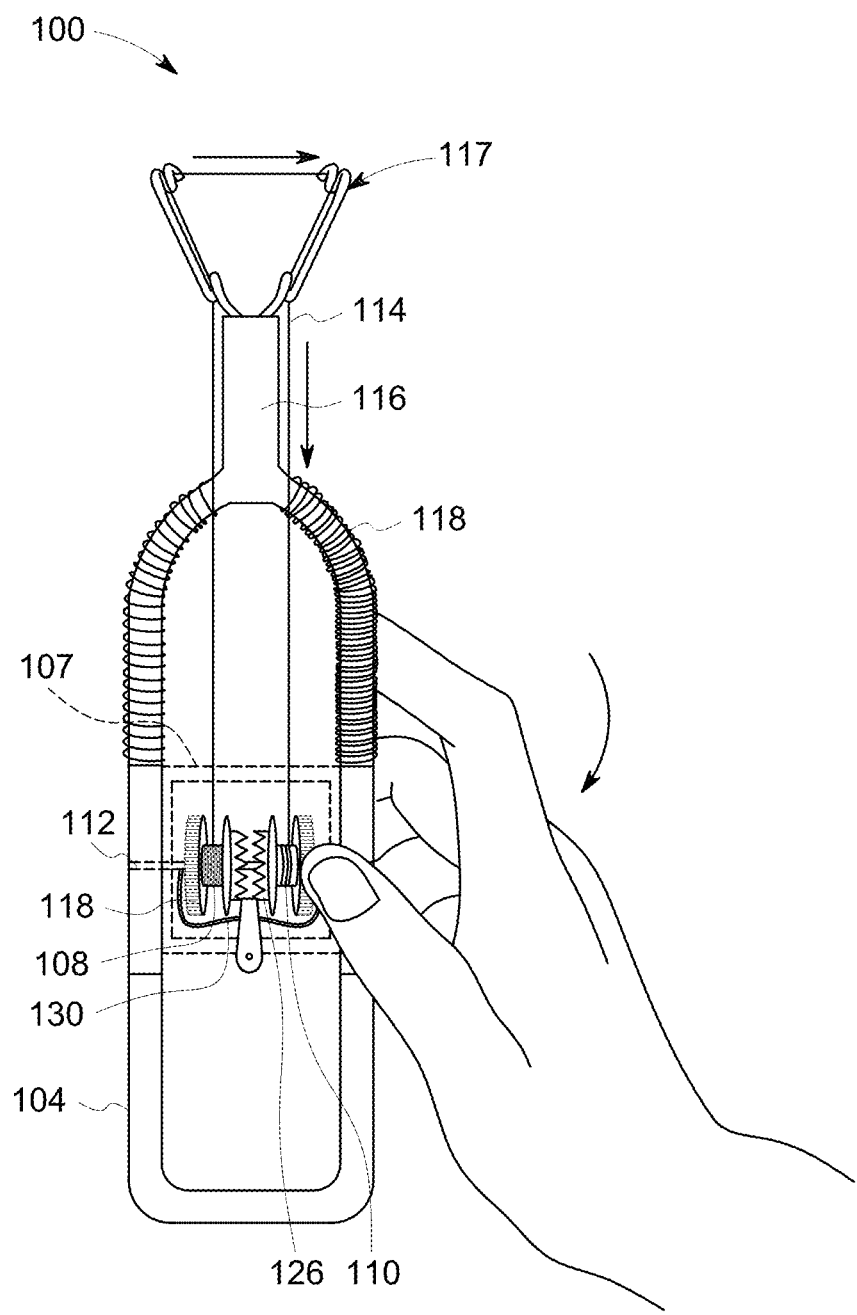
FIG. 4B illustrates a schematic view of the hand-held dental flossing device operated by the user in order to increase the tension of the dental floss, in accordance with embodiments of the invention.

FIG. 4B refers to a schematic view of the hand-held dental flossing device 100 operated by the user in order to increase the tension of the dental floss 114. In one embodiment herein, the user holds the first spool 108 and rotates the second spool 110 via the clutch system 126. The length of the dental floss 114 at the closed loop decreases by increasing the tension while moving the floating platform 106 closer to the head 116 through the elastic members 128.

Figure 4C:
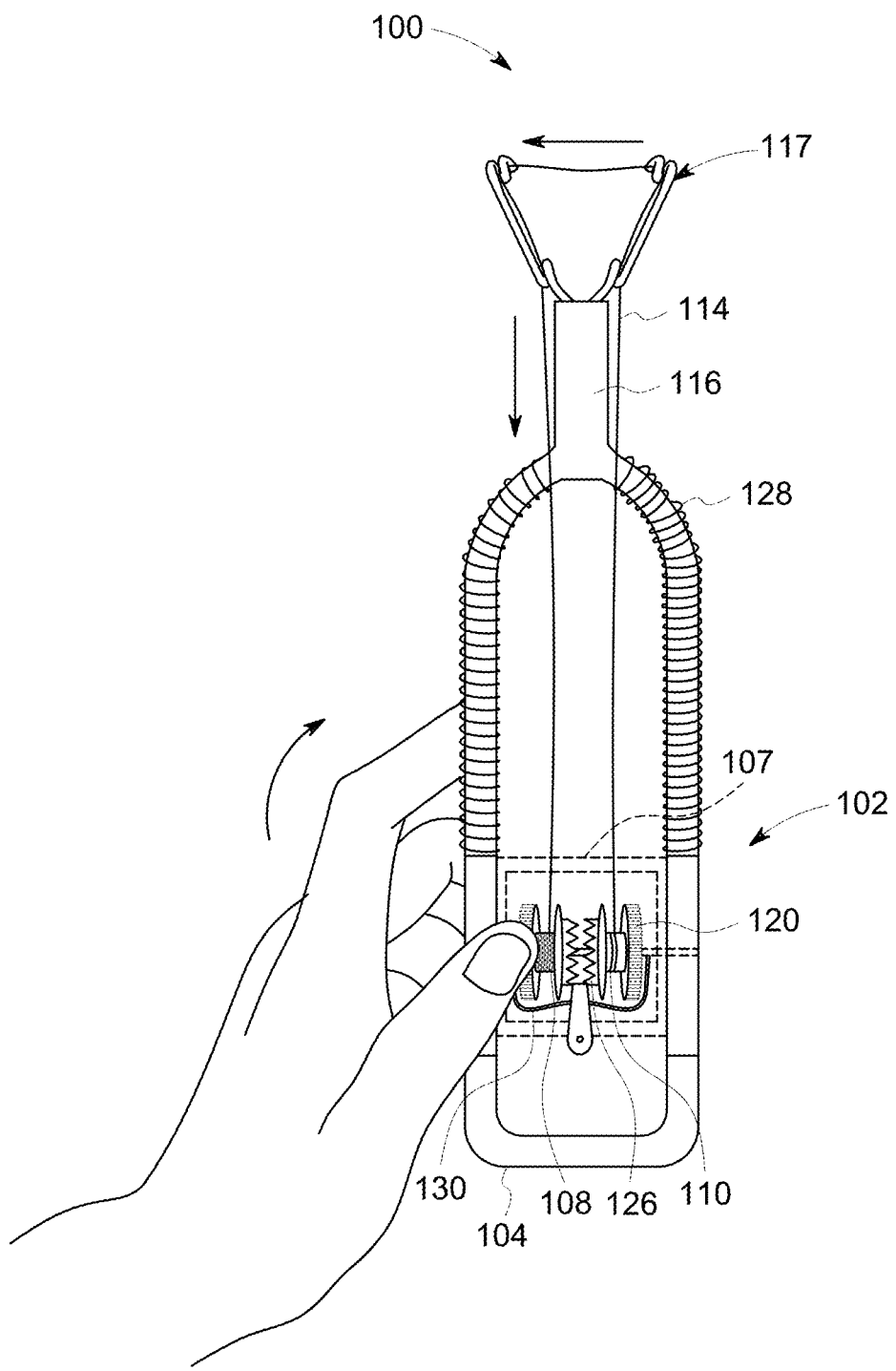
FIG. 4C illustrates a schematic view of the hand-held dental flossing device operated by the user in order to decrease the tension of the dental floss, in accordance with embodiments of the invention.

FIG. 4C refers to a schematic view of the hand-held dental flossing device 100 operated by the user in order to decrease the tension of the dental floss 114. In one embodiment herein, the user holds the second spool 110 and rotates the first spool 108 via the clutch system 126. The dental floss 114 added to the closed loop moves the floating platform 106 away from the head 116, thereby decreasing the tension of the dental floss 114 as the elastic members 128 become less compressed. The ratchet pawl 127 is configured to prevent the user from winding the used dental floss 114 back on to the first spool 108.

Figure 5:
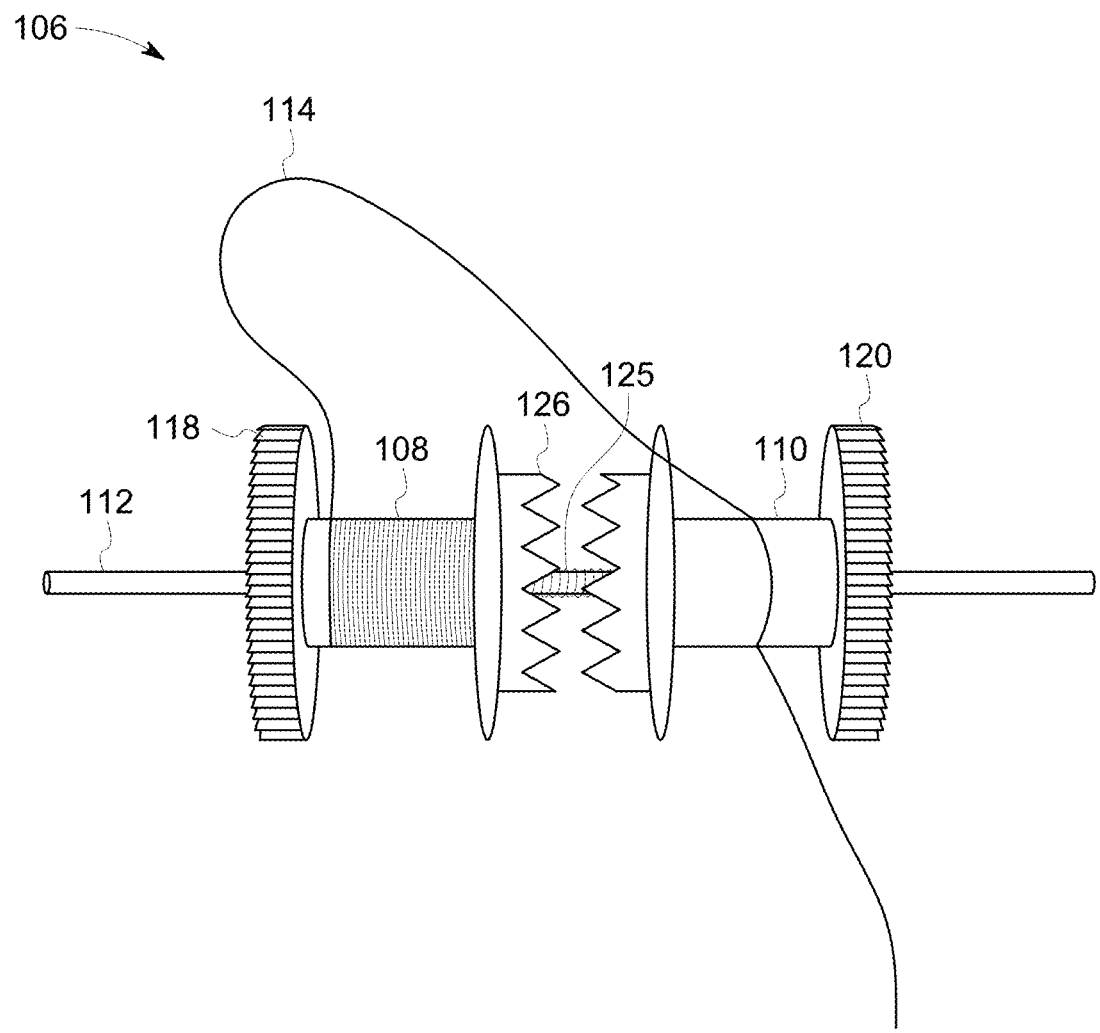
FIG. 5 illustrates a schematic view of the floating platform of the hand-held dental flossing device attached with a spring to engage the clutch system, in accordance with embodiments of the invention.

FIG. 5 refers to a schematic view of the floating platform 106 of the hand-held dental flossing device 100 attached with a spring 125 to engage the clutch system 126. In another embodiment herein, the floating platform 106 comprises a spring 125, which is flexibly connected between the axle 112 and the first spool 108, the second spool 110. The spring 125 is configured to engage the clutch system 126 when the user applies pressure on both sides of the floating platform 106. In another embodiment herein, the spring 125 replaces the clip fastener 130 (FIG. 4C), thereby providing a space around the first spool 108 and the second spool 110.

Figure 6:
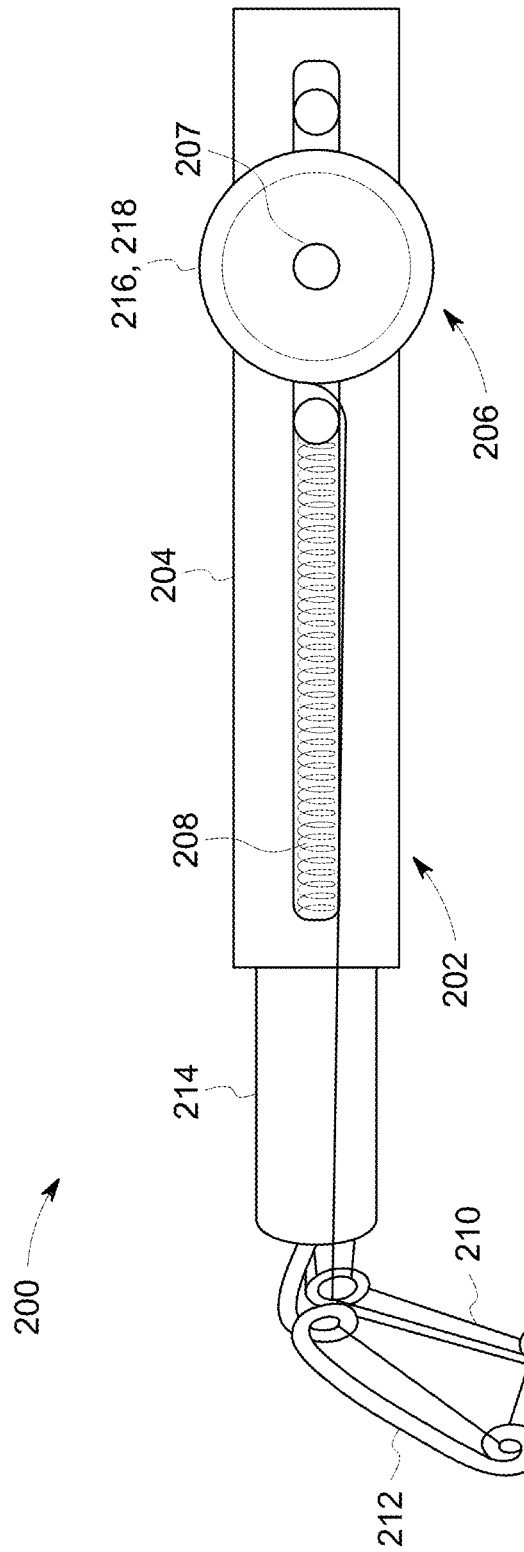
FIG. 6 illustrates a side view of the hand-held dental flossing device with a single split or solid handle, in accordance with embodiments of the invention.

FIG. 6 refers to a side view of the hand-held dental flossing device 200 with single split or solid handle 204. In another embodiment herein, the hand-held dental flossing device 200 comprises a body 202, a floating platform 206, and a head 212. In one embodiment herein, the body 202 having a handle 204 with a groove. The head 212 is configured with plurality of arms 214 pivotally affixed to an end of the handle 204. The handle 204 comprises a scale, which facilitates the user to adjust the tension of the dental floss 210 at various levels. The various modes of the hand-held dental flossing device 200 include a minimum tension mode, a nominal tension mode, and a maximum tension mode.

In one embodiment herein, the plurality of arms 214 comprises one or more closed loops to facilitate a passage of a dental floss 210, which is used for flossing of teeth. The plurality of arms 214 is made of at least one material includes stainless-steel. The plurality of arms 214 is coated with silicone, which provides comfort to the user during the flossing of teeth.

In one embodiment herein, the floating platform 206 configured to movably position on the handle 204 through an axle 207 via the groove, thereby providing support for the floating platform 206 by the handle 204. In one embodiment herein, the floating platform 206 comprises a first spool 216, and a second spool 218.

In one embodiment herein, the floating platform 206 comprises a clip fastener, which is configured to hold the first spool 216, the clutch system, and the second spool 218 together on the axle 207 by applying pressure on both sides of the floating platform 206. The floating platform 206 is detachably positioned on the handle 204, thereby allowing the user to simply load and replace the first spool 216 with the dental floss 210 and the second spool 218.

In one embodiment herein, the first spool 216 is rotatably mounted on the axle 207 at one side of the handle 204. The first spool 216 is configured for winding the dental floss 210 for discharging upon rotation by a user. The second spool 218 is rotatably mounted on the axle 207 at another side of the handle 204. The second spool 218 is adapted to secure a free end of the dental floss 210 received from the first spool 216 through the one or more closed loops and wind a used portion of the dental floss 210 upon rotation of the first spool 216 and the second spool 218 simultaneously by the user.

In one embodiment herein, each of the first spool 216 and the second spool 218 comprise a knurled disc, which facilitates the user to manually rotate and hold the first spool 216 and the second spool 218. Each of the knurled disc of the first spool 216 and the second spool 218 enable user to grip and rotate the first spool 216 and the second spool 218.

In one embodiment herein, the first spool 216 and the second spool 218 are rotatably connected to each other on the axle 207 through a clutch system, thereby controlling a tension of the dental floss 210 at the head 212 where the user flossing the teeth upon rotation of the first spool 216 and the second spool 218, respectively.

In one embodiment herein, the clutch system is a slipper clutch. The clutch system is connected to a ratchet pawl, which is used to limit rotational motion of the at least one of the first spool 216 and the second spool 218 in a direction while setting the tension of the dental floss 210.

In one embodiment herein, the floating platform 206 is adapted to move through the groove of the handle 204 towards the head 212 against an elastic member 208 disposed within the groove when the user increasing tension of the dental floss 210 at the head 212 by rotating the second spool 218 and holding the first spool 216, and decreasing the tension of the dental floss 210 by rotating the first spool 216 and holding the second spool 218. In one embodiment herein, the elastic member 208 is configured to provide and maintain a constant tension of the dental floss 210 at the head 212 of the hand-held dental flossing device 200, thereby preventing shredding and tangling of the dental floss 210. In one embodiment herein, the elastic member 208 is a spring. The hand-held dental flossing device 200 enables the user to control the tension of the dental floss 210 at various modes by operating the first spool 216 and the second spool 218.

Figure 7:
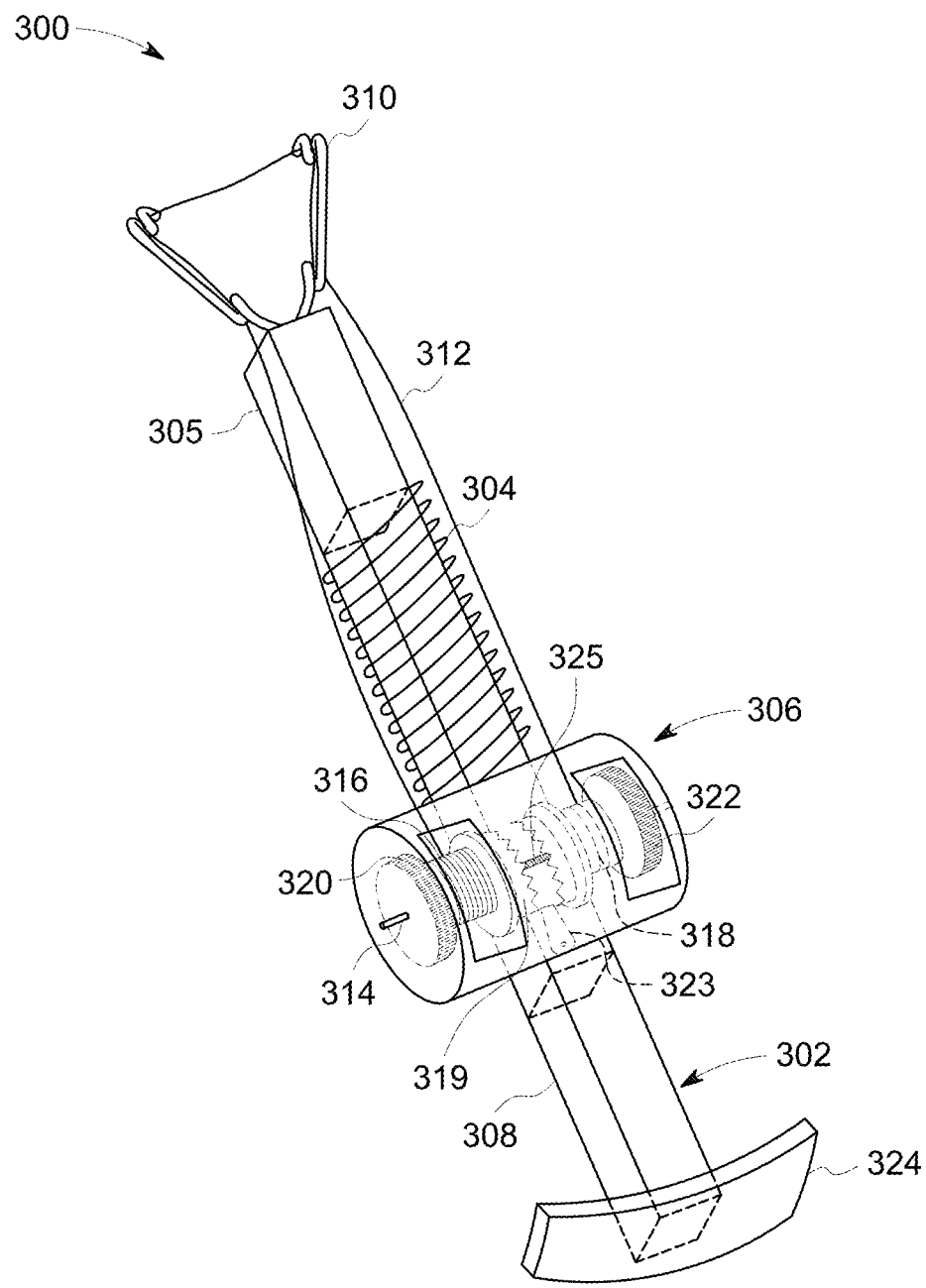
FIG. 7 illustrates a perspective view of the hand-held dental flossing device with a square solid core center design, in accordance with embodiments of the invention.

FIG. 7 refers to a perspective view of the hand-held dental flossing device 300 with a square solid core center design. In another embodiment herein, the hand-held dental flossing device 300 comprises a solid core member 302, an elastic member 304, a head 305 and a floating platform 306. In one embodiment herein, the solid core member 302 having a handle 308. In one embodiment herein, the solid core member 302 could be in square, circular, rectangular or other regular shapes. The head 305 is configured with plurality of arms 310 pivotally affixed to an end of the handle 308.

In one embodiment herein, the plurality of arms 310 comprises one or more closed loops to facilitate a passage of a dental floss 312, which is used for flossing of the teeth. The plurality of arms 310 is made of at least one material includes stainless-steel. The plurality of arms 310 is coated with silicone, which provides comfort to the user during the flossing of teeth.

In one embodiment herein, the floating platform 306 configured to movably position on the handle 308 through an axle 314, thereby providing support for the floating platform 306 by the handle 308. In one embodiment herein, the floating platform 306 comprises a first spool 316, and a second spool 318. The floating platform 306 is detachably positioned on the handle 308, thereby allowing the user to simply load and replace the first spool 316 with the dental floss 312 and the second spool 318.

In one embodiment herein, the first spool 316 is rotatably mounted on the axle 314 at one side of the handle 308. The first spool 316 is configured for winding the dental floss 210 and fer discharging upon rotation by a user. The second spool 318 is rotatably mounted on the axle 314 at another side of the handle 308. The second spool 318 is adapted to secure a free end of the dental floss 312 received from the first spool 316 through the one or more closed loops and wind a used portion of the dental floss 312 upon rotation of the first spool 316 and the second spool 318 simultaneously by the user.

In one embodiment herein, each of the first spool 316 and the second spool 318 comprise a knurled disc (320, 322), which facilitates the user to manually rotate and hold the first spool 316 and the second spool 318. Each of the knurled disc (320, 322) of the first spool 316 and the second spool 318 enable user to grip and rotate the first spool 316 and the second spool 318.

In one embodiment herein, the first spool 316 and the second spool 318 are rotatably connected to each other on the axle 314 through a clutch system 319, thereby controlling a tension of the dental floss 312 at the head 305 where the user flossing the teeth upon rotation of the first spool 316 and the second spool 318, respectively.

In one embodiment herein, the clutch system 319 is a slipper clutch. The clutch system 319 is connected to a ratchet pawl 323, which is used to limit rotational motion of the at least one of the first spool 316 and the second spool 318 in a direction while setting the tension of the dental floss 312.

In one embodiment herein, the floating platform 306 is adapted to move towards the head 305 against an elastic member 304 mounted externally around the solid core member 302 when the user increasing the tension of the dental floss 312 at the head 305 by rotating the second spool 318 and holding the first spool 316, and decreasing the tension of the dental floss 312 by rotating the first spool 316 and holding the second spool 318. In one embodiment herein, the elastic member 304 is configured to provide and maintain a constant tension of the dental floss 312 at the head 305 of the hand-held dental flossing device 300, thereby preventing shredding, sagging and tangling of the dental floss 312. In one embodiment herein, the hand-held dental flossing device 300 enables the user to control the tension of the dental floss 312 at various modes by operating the first spool 316 and the second spool 318.

In another embodiment herein, the floating platform 306 comprises a spring 325, which is flexibly connected between the axle 314 and the first spool 316, the second spool 318. The spring 325 is configured to engage the clutch system 319 when the user applies pressure on both sides of the floating platform 306.

In one embodiment herein, the handle is supported with a palm rest 324, which is configured to aid the user to grip and rest his/her palm on the handle 308, while flossing the teeth. In one embodiment herein, the solid core member 302 terminates any rotational tendencies of the first spool 316 and the second spool 318 during the movement of the floating platform 306. The hand-held dental flossing device 300 reduces the complexity in design with less number of components. The design of the hand-held dental flossing device 300 makes the replacement of the first spool 316, the second spool 318 easy and simple.

Figure 8:
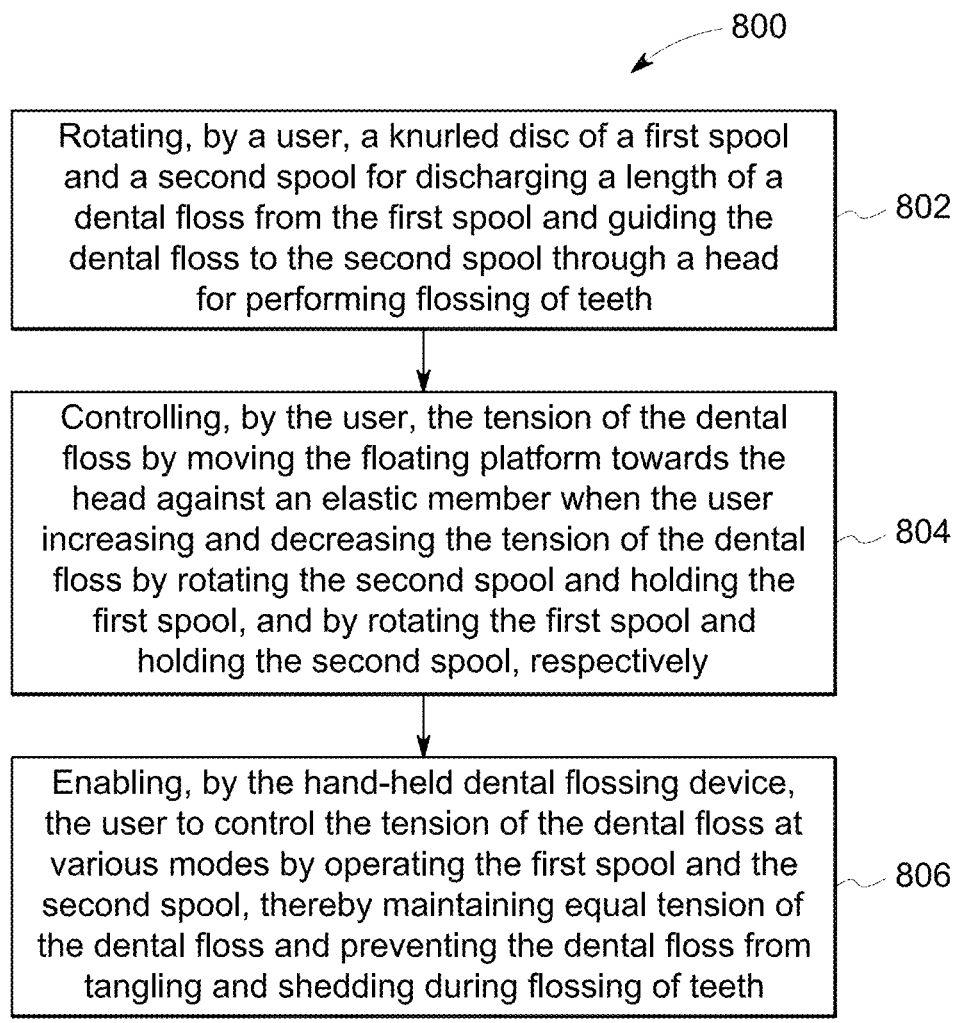
FIG. 8 illustrates a flowchart of a method for operating the hand-held dental flossing device, in accordance with embodiments of the invention.

FIG. 8 refers to a flowchart 800 of a method for operating the hand-held dental flossing device 100 for flossing of teeth. At step 802, the user rotates the knurled disc (118, 120) of the first spool 108 and the second spool 110 for discharging a length of the dental floss 114 from the first spool 108 and guiding the dental floss 114 to the second spool 110 through the head 116 for performing flossing of teeth.

At step 804, the user controls the tension of the dental floss 114 by moving the floating platform 106 towards the head 116 against the elastic member 128 when the user increases the tension of the dental floss 114 by rotating the second spool 110 and holding the first spool 108, and decreases the tension of the dental floss 114 by rotating the first spool 108 and holding the second spool 110, respectively.

At step 806, the hand-held dental flossing device 100 enables the user to control the tension of the dental floss 114 at various modes by operating the first spool 108 and the second spool 110, thereby maintaining constant tension of the dental floss 114 and preventing the dental floss 114 from tangling, sagging and shredding during flossing of teeth.

Figure 9A:
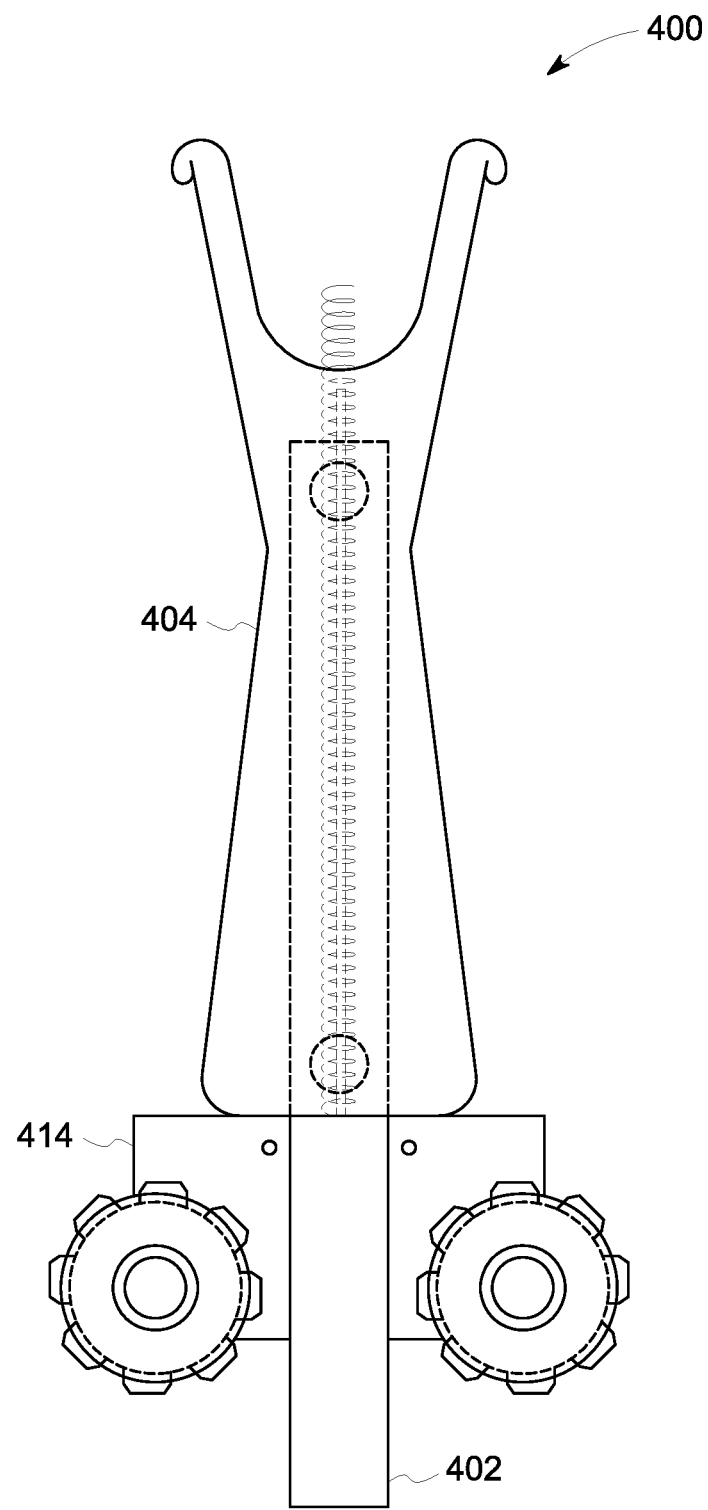
FIG. 9A illustrates a schematic view of a hand-held dental flossing device, in accordance with embodiments of the invention.
Figure 10:
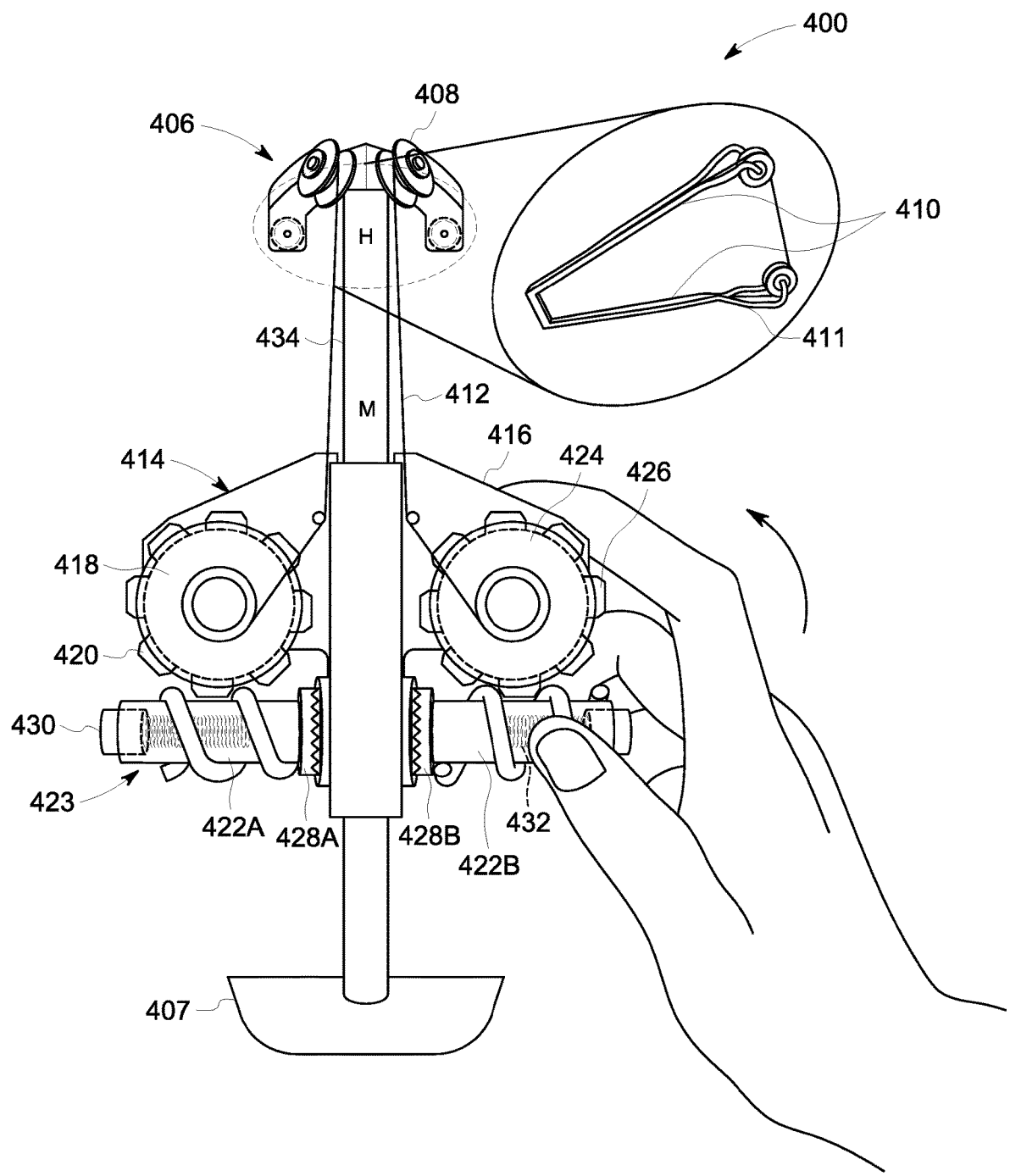
FIG. 10 illustrates a perspective view of the hand-held dental flossing device, in accordance with embodiments of the invention.

FIG. 9A refers to a schematic view of a hand-held dental flossing device 400. In one embodiment herein, the hand-held dental flossing device 400 comprises a body 402, a handle 404, a head 406 (as shown in FIG. 10), and a floating platform 414. The hand-held dental flossing device 400 is ergonomically designed to improve the user's experience during dental flossing operations by enabling effective control and ease of use.

In one embodiment herein, the body 402 comprises a handle 404 configured with a split or solid structure at one end and a palm rest 407 (as shown in FIG. 10) at the other end. The split or solid structure of the handle 404 is designed to align with the user's grip, thereby allowing secure handling during flossing operations. The palm rest 407 provides ergonomic support, enhancing comfort and reducing fatigue during prolonged use.

Figure 9B:
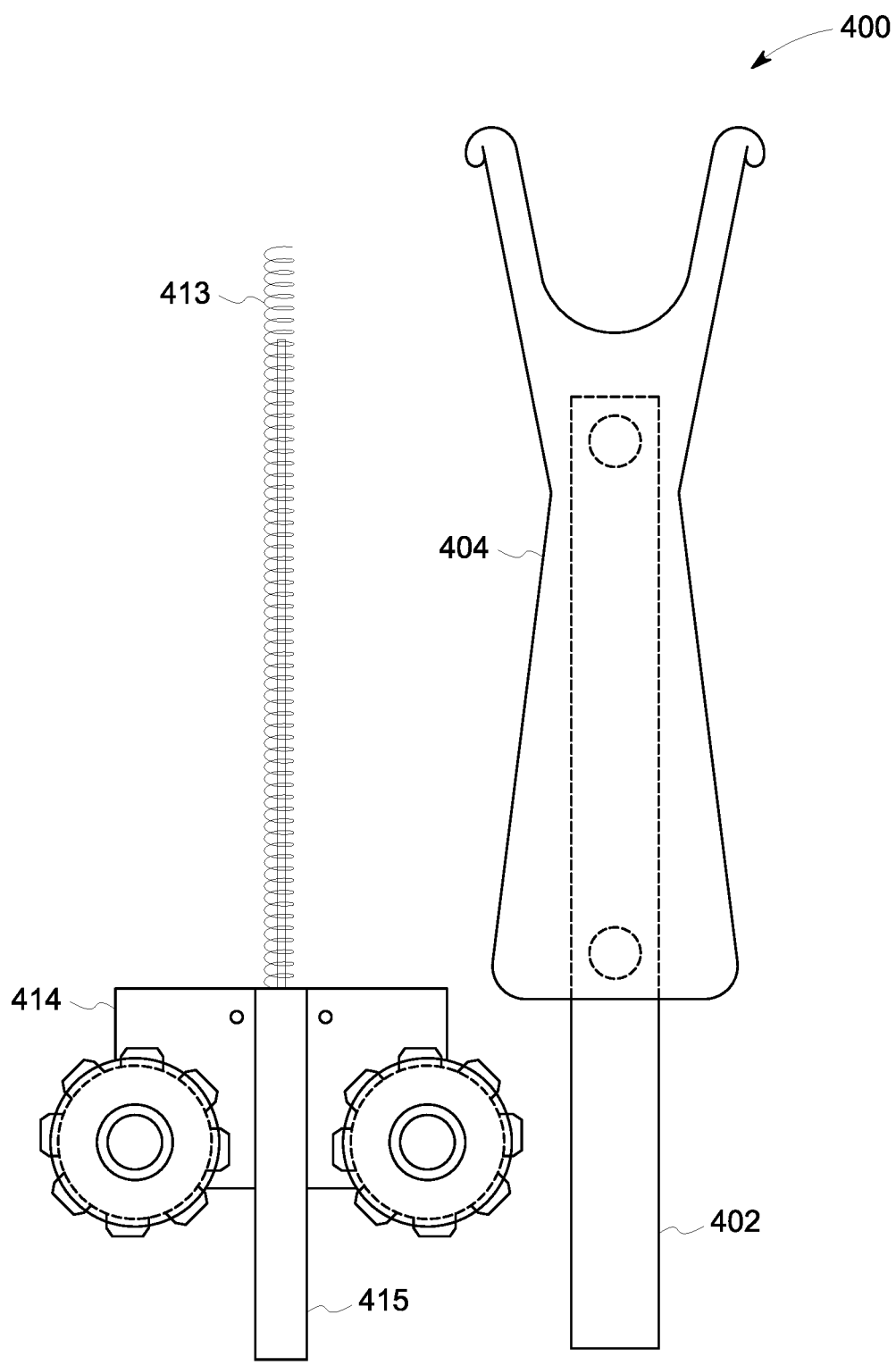
FIG. 9B illustrates an exploded view of a hand-held dental flossing device, in accordance with embodiments of the invention.

FIG. 9B refers to an exploded view of the hand-held dental flossing device 400. In one embodiment herein, the floating platform 414 is designed to integrate smoothly within the handle 404 of the hand-held dental flossing device 400. This floating platform 414 is equipped with a holding member 415, which ensures secure positioning within a case member 416 (as shown in FIG. 9C). The floating platform 414 is movably mounted to allow longitudinal movement, thereby enabling the user to adjust the tension of the dental floss 412 (as shown in FIG. 10) dynamically during use. This movement is facilitated by the elasticity of an elastic member 413, such as a non-linear spring, mounted within the handle 404. The elastic member 413 provides a counteracting force that maintains consistent tension on the dental floss 412 while preventing tangling and ensuring smooth operation.

FIG. 10 refers to a perspective view of the hand-held dental flossing device 400. In one embodiment herein, the handle 404 is equipped with a scale 434, which allows the user to adjust and monitor the tension of the dental floss 412. The scale 434 provides distinct settings, such as minimum, nominal, and maximum tension, to accommodate various flossing preferences. In one embodiment herein, the hand-held dental flossing device 400 may be depicted without the handle 404.

In one embodiment herein, the head 406 is securely affixed to one end of the handle 404 and features plurality of arms 410, the each arm 410 of the plurality of arms 410 is configured to form one or more closed loops 411. These loops facilitate the passage of dental floss 412, thereby ensuring proper alignment during use. The plurality of arms 410 is constructed from stainless steel and coated with silicone to provide durability and user comfort. The silicone coating minimizes irritation during flossing, thereby making the hand-held dental flossing device 400 suitable for sensitive areas of the mouth.

The head 406 is adapted to hold the dental floss 412 in a slim-line profile to optimize user comfort and ergonomics, thereby enabling the hand-held dental flossing device 400 to fit comfortably in the user's hand and facilitating easy maneuverability during dental flossing operations. The plurality of arms 410 is adapted to conceal the dental floss 412 and is exposed between the plurality of micro pulleys 408, thereby reducing the visual appearance and enhancing the overall aesthetics of the hand-held dental flossing device 400.

The floating platform 414 is a key component, designed to slide within the handle 404 and dynamically adjust floss tension. The floating platform 414 includes the holding member 415 (as shown in FIGS. 9A-9B) for secure positioning within the handle 404, the case member 416 defining a chamber, a first spool 418, and a second spool 424.

The first spool 418 is rotatably mounted within the case member 416 and is equipped with a primary worm gear profile 420. This primary worm gear profile 420 profile engages with a first worm 422A, which is mounted on one side of an axle shaft 423 protruding through the handle 404. The user can manually rotate the first worm 422A to unwind fresh dental floss 412 from the first spool 418. In one embodiment herein, the second spool 424 is similarly rotatably mounted within the case member 416 and is designed to collect used dental floss 412. It features a secondary worm gear profile 426, which engages with a second worm 422B for smooth operation. The second worm 422B is configured for winding used dental floss onto the second spool. The second worm 422B is configured to be rotatably mounted on another side of the axle shaft 423.

The floating platform 414 is equipped with a pair of clutches (428A, 428B) mounted on the axle shaft 423 on both sides while aligning with the first worm 422A and the second worm 422B. The primary clutch 428A is connected to the first spool 418 via the first worm 422A, allowing the unwinding of fresh floss when engaged. The secondary clutch 428B is connected to the second spool 424 via the second worm 422B, enabling the winding of used floss when engaged. In one embodiment herein, at least one flexible spring 432 positioned over the axle shaft 423 on both sides, thereby positioning between the primary clutch 428A and a bushing member 430 affixed to one end of the first worm 422A, and between the secondary clutch 428B and another bushing member 430 affixed to one end of the second worm 422B, thereby exerting a restoring force to facilitate controlled engagement of the pair of clutches (428A, 428B) and enabling controlled slipping under predetermined torque conditions, and enabling the user to independently control the rotation of the first spool 418 and the second spool 424 while rotating the first worm 422A and the second worm 422B, respectively.

In one embodiment herein, the elastic member 413, implemented as a non-linear spring, is mounted within the handle 404. The floating platform 414 moves against this elastic member 413, adjusting the tension of the dental floss 412 at the head 406. The user either decreases the tension by rotating the first worm 422A at the first spool 418 in the clockwise direction while holding the second worm 422B stationary at the second spool 424 or increases floss tension by rotating the second worm 422B at the second spool 424 in the clockwise direction while holding the first worm 422A stationary at the first spool 418. This mechanism provides flexibility and precision in tension control, accommodating varying flossing needs.

In another embodiment, the floating platform 414 is configured to be detachable from the handle 404, allowing for easy replacement of the first spool 418 and the second spool 424. This detachable design simplifies maintenance and enhances usability. In one embodiment herein, the first spool 418 and the second spool 424 are mounted horizontally within the case member 416, reducing the device's overall profile and improving user comfort. This configuration also ensures smoother floss operation by optimizing the floss path.

Figure 11:
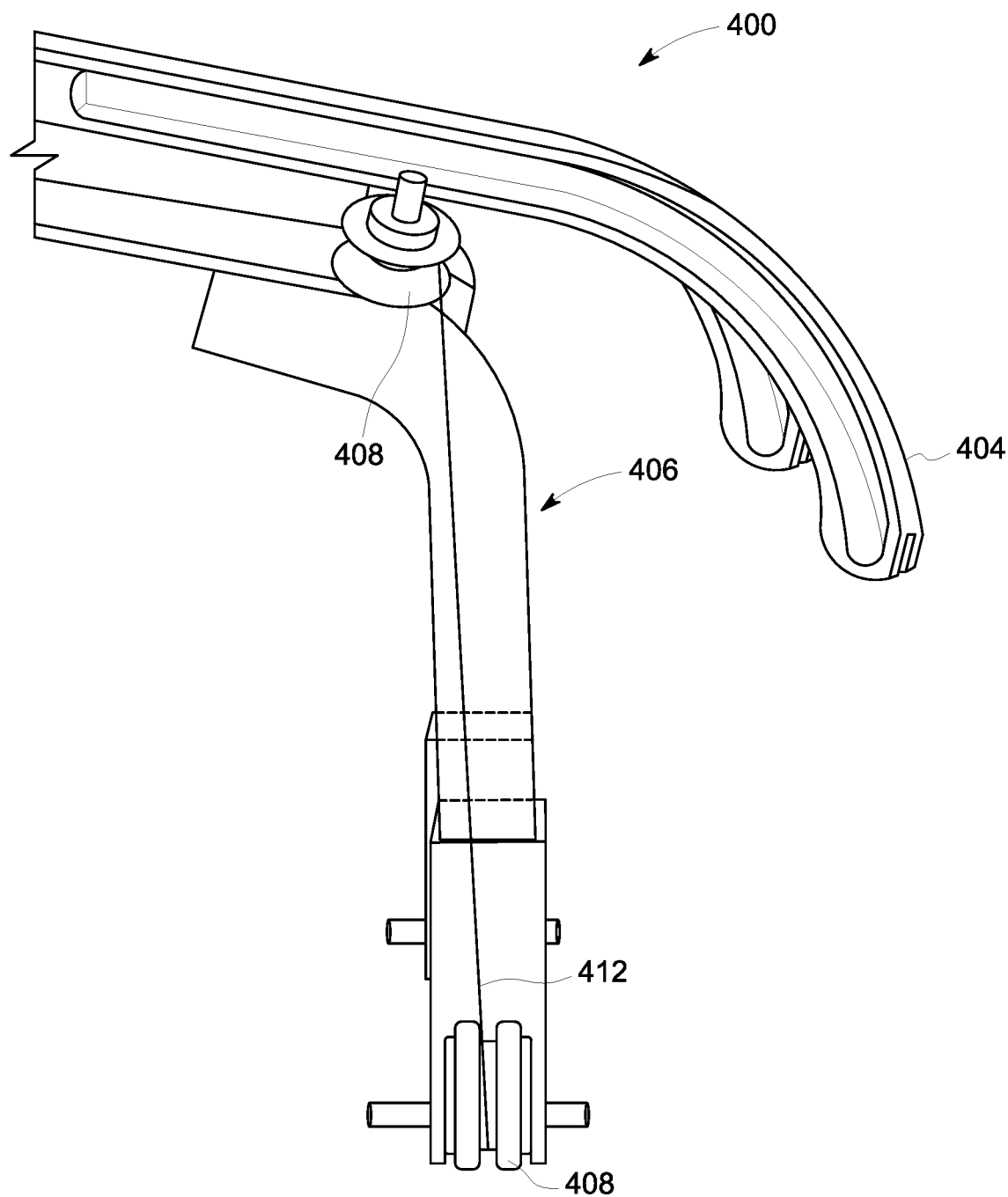
FIG. 11 illustrates a side view of the hand-held dental flossing device, in accordance with embodiments of the invention.

FIG. 11 refers to a side view of the hand-held dental flossing device 400. In one embodiment herein, the head 406 incorporates a plurality of micro pulleys 408, strategically positioned at critical bend points. The plurality of micro pulleys 408 minimize friction and maintain consistent tension on the dental floss 412, thereby ensuring smooth operation, even with thicker or waxed floss. In one embodiment herein, the pair of clutches (428A, 428B) (as shown in FIG. 9C) are slipper clutches, designed to limit rotational motion and maintain floss tension. In one embodiment herein, the floating platform 414 incorporates bank winding techniques, thereby ensuring consistent floss tension by compensating for varying wind diameters of the dental floss 412, where one spool is fully wound while the other is empty, resulting in disparate wound floss diameters and mean floss lengths. It is the wind diameter, rather than the spool diameter, that introduces positional errors, which the floating platform 414 cancels out to maintain consistent tension. In one embodiment herein, the hand-held dental flossing device 400 is constructed from lightweight and durable materials, ensuring long-term reliability. The ergonomic and compact design enhances user comfort, making the device suitable for everyday use.

Figure 12A:
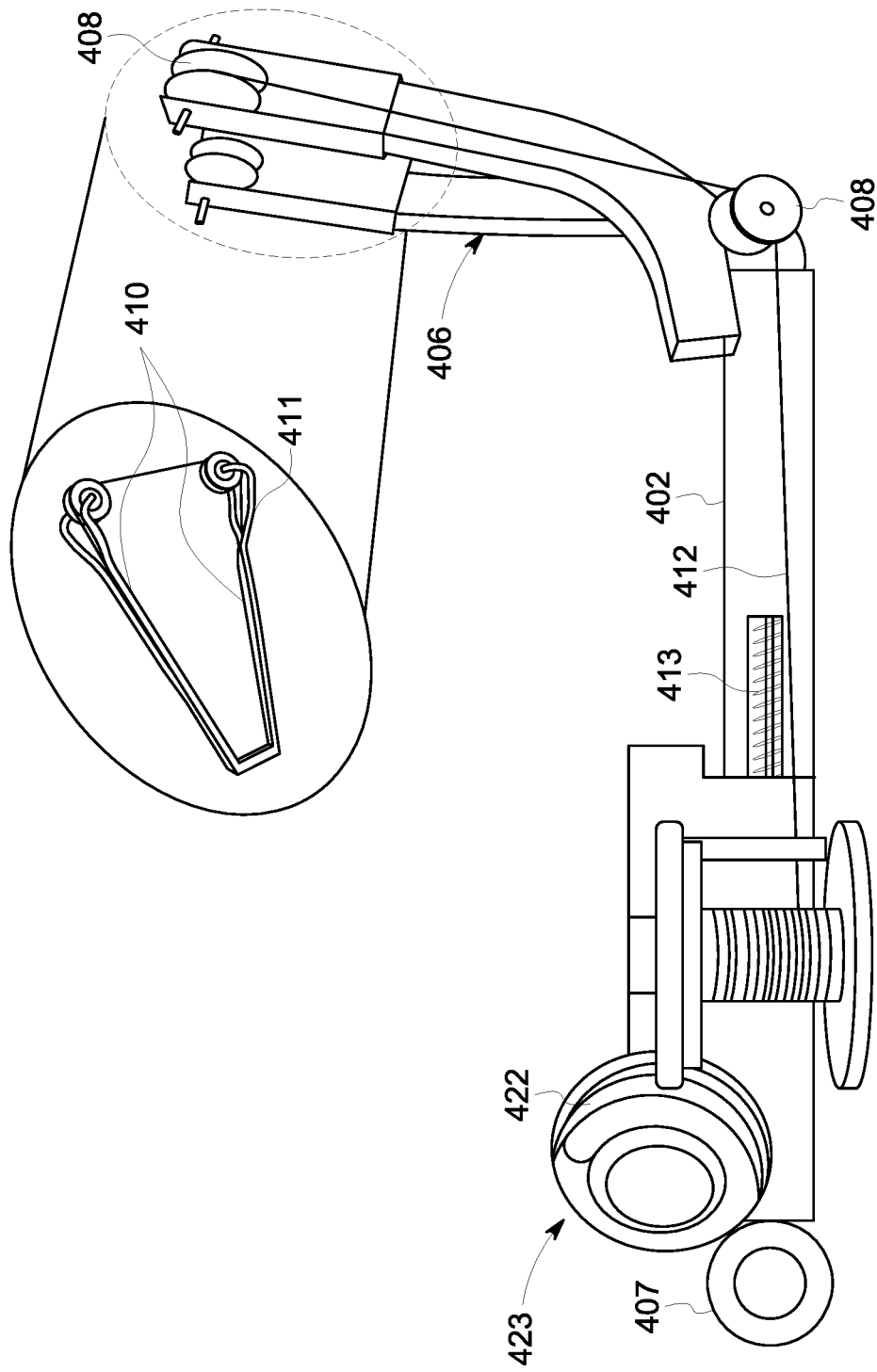
FIGS. 12A-12C illustrate perspective views of the hand-held dental flossing device, in accordance with embodiments of the invention.
Figure 12B:
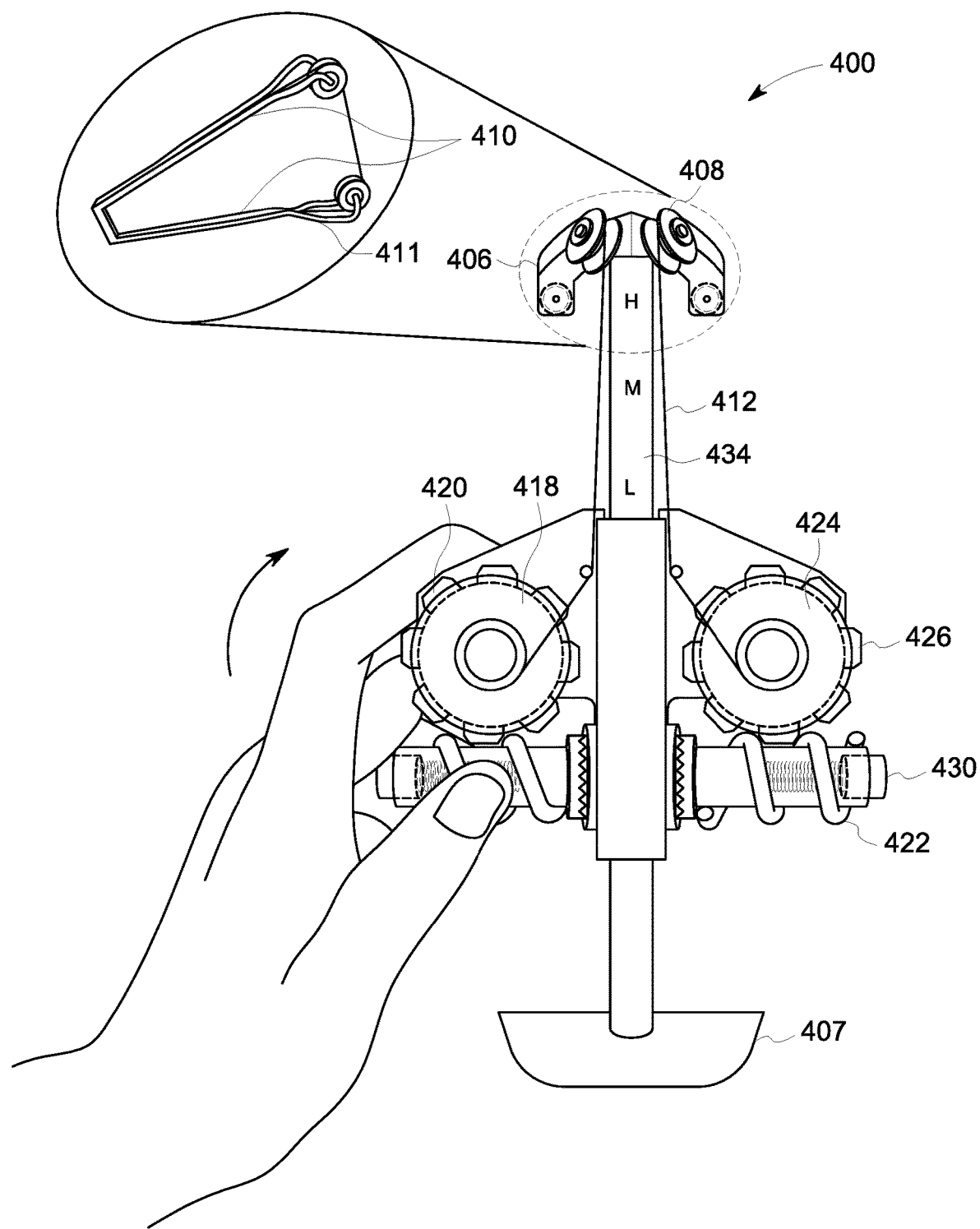
Figure 12C:
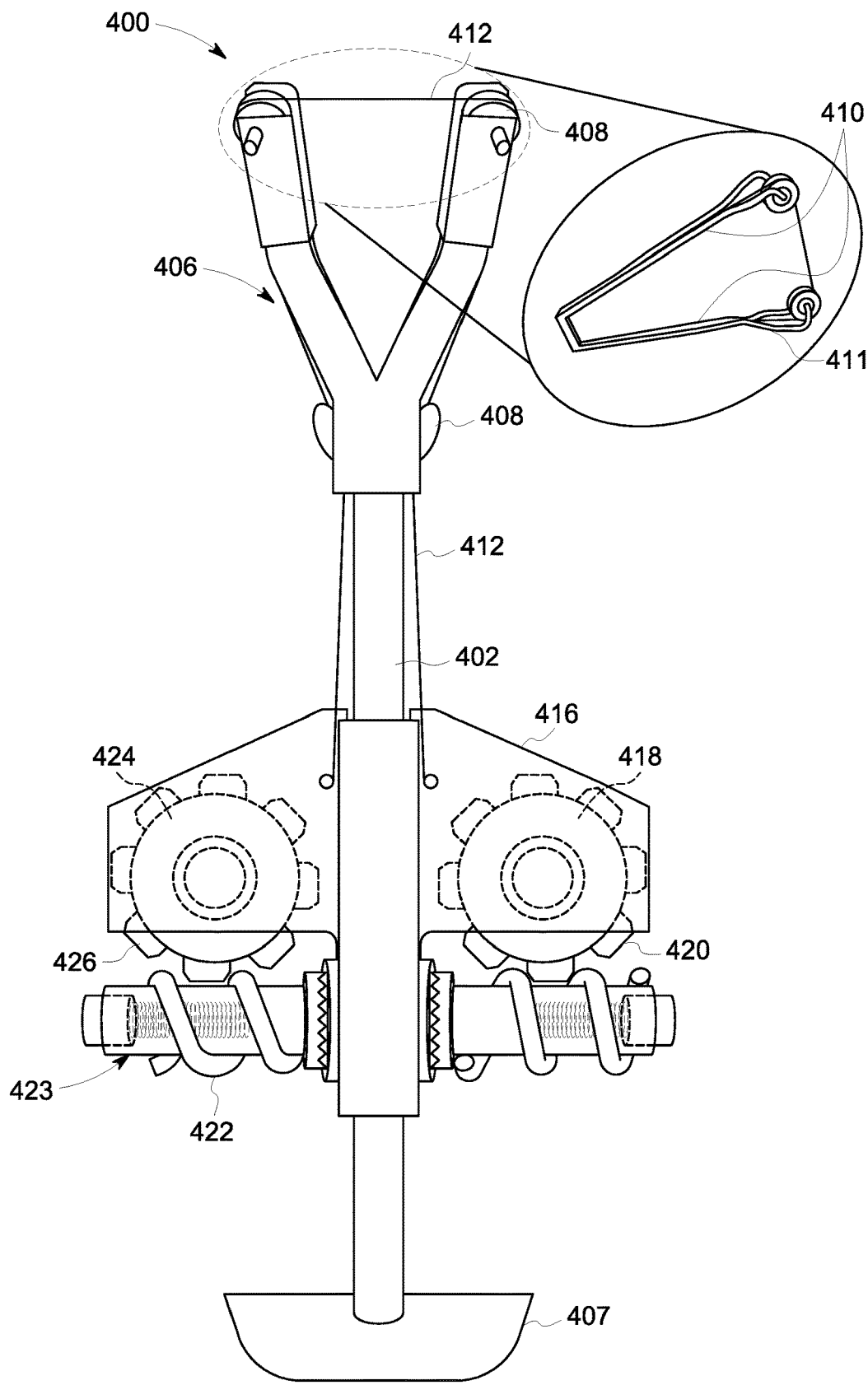

FIGS. 12A-12C refer to perspective views of the hand-held dental flossing device 400. The operation of the hand-held dental flossing device 400 begins with the user securing the device by gripping the handle 404, which is ergonomically designed with the palm rest 407 for enhanced comfort and control. The flossing operation relies on the plurality of arms 410 at the head 406, which are configured with one or more closed loops 411 to guide the dental floss 412 effectively. The plurality of arms 410 ensure that the dental floss 412 remains properly aligned and taut, even during dynamic movements, allowing the user to precisely clean between teeth.

To initiate flossing, the user first ensures that fresh dental floss 412 is available on the first spool 418, located within the floating platform 414. The dental floss 412 is threaded through the closed loops 411 on the head 406 and wound onto the second spool 424, which is designed to collect the used floss. The primary worm gear profile 420 on the first spool 418 engages with the first worm 422A, thereby enabling the user to manually unwind the floss by rotating the axle shaft 423. Similarly, the secondary worm gear profile 426 on the second spool interacts with the second worm 422 to facilitate the winding of the used floss.

The head 406 is adapted to an open-frame structure that allows for easy and through rinsing of the dental floss 412 after each use. The open-frame structure allows water to run freely through the dental floss 412, effectively eliminating any debris and residue that may accumulate during flossing. In one example embodiment herein, the open-frame structure of the head 406 is similar to a toothbrush, thereby allowing the dental floss 412 to be fully exposed while cleaning. Once cleaned, the dental floss 412 is easily reused by air-drying, thereby ensuring it is ready for the next use.

During operation, the user can independently control the unwinding and winding mechanisms through the pair of clutches (428A, 428B). The primary clutch 428A engages the first spool 418 for unwinding, while the secondary clutch 428B operates the second spool 424 for winding. The plurality of bushing members 430 facilitates the movement of the first worm 422A and the second worm 422B using the pair of clutches (428A, 428B), thereby enabling precise control over the floss tension at the head 406. By alternately engaging the pair of clutches (428A, 428B), the user can maintain a continuous flow of fresh floss while simultaneously collecting the used portion.

The spring 413 within the handle 404 plays a critical role in tension management. As the floss is manipulated, the floating platform 414 moves against the spring 413 for maintaining consistent tension across the dental floss 412. The user can observe the tension level using the scale 434 on the handle 404, which provides visual indicators for minimum, nominal, and maximum tension settings. This ensures that the dental floss 412 remains taut but not overly tight, thereby preventing breakage or discomfort.

For more intricate areas, such as molars or hard-to-reach spaces, the head 406 is designed with a slight bend to enhance maneuverability. The integration of micro pulleys 408 at critical points near the head 406 reduces friction and facilitates smooth floss movement, even when thicker or waxed floss is used. This advanced design allows the dental floss 412 to glide effortlessly through tight interdental spaces without losing tension or causing strain on the user's hand.

After completing the flossing procedure, the user can slip the primary clutch 428A and the secondary clutch 428B to replace the spools if necessary, in zero-tension setting. The floating platform 414 is designed for quick removal, enabling straightforward replacement of both the fresh and used floss spools. This modular design ensures that the hand-held dental flossing device 400 remains easy to maintain while providing a hygienic and efficient solution for daily flossing needs.

Figure 12D:
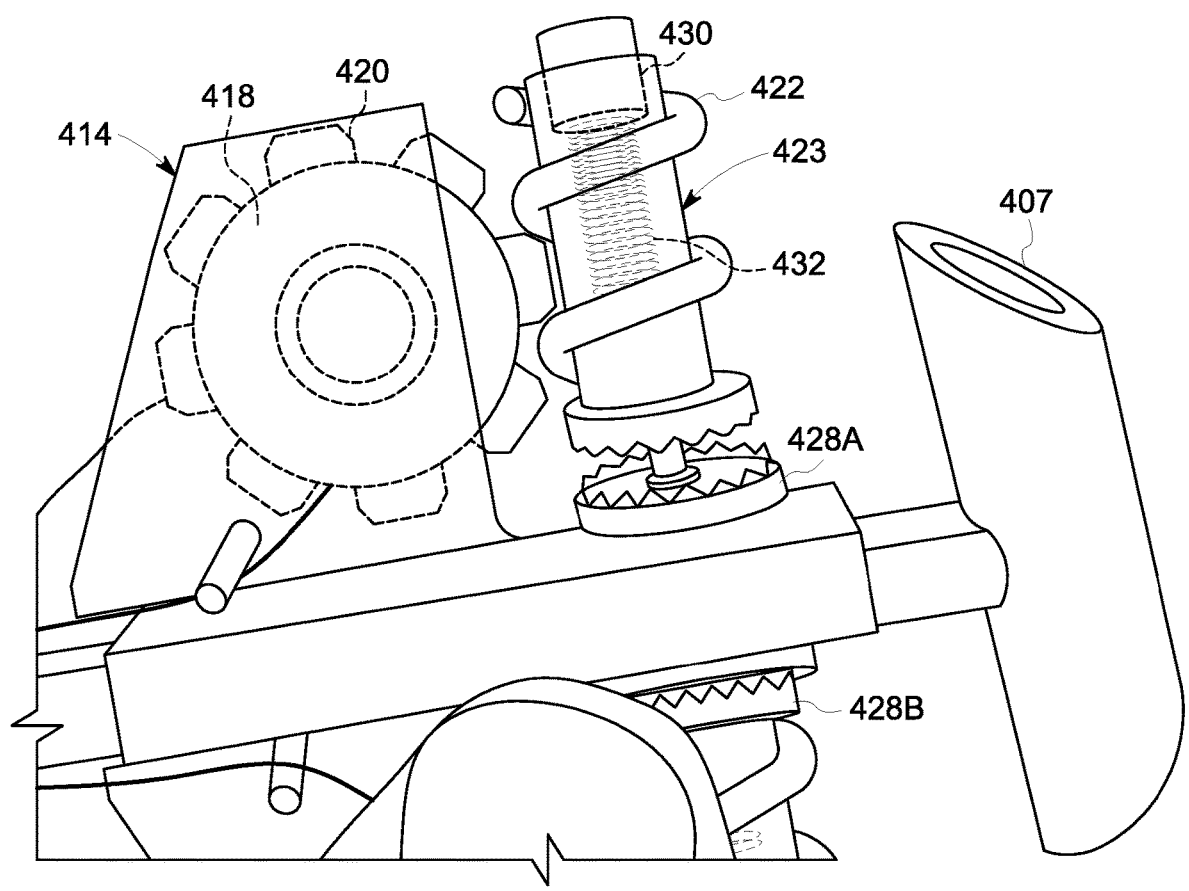
FIG. 12D illustrates a schematic view of the hand-held dental flossing device, in accordance with embodiments of the invention.

FIG. 12D refers to a schematic view of the hand-held dental flossing device 400. The axle shaft 423 having diameter of at least 2 mm. The bushing member 430 is configured to provide structural support to the first worm 422A and the second worm 422B and facilitate smooth sliding movement within the axle shaft 423 using the flexible spring 432. The axle shaft 423 is integrated within the first worm 422A and the second worm 422B, thereby ensuring precise alignment and efficient operation of the dental flossing device 400.

In one embodiment herein, the flexible spring 432 is flexibly over the axle shaft 423, and adapted to allow controlled pressure against the each of the primary clutch 428A and the secondary clutch 428B, effectively. This arrangement allows the primary clutch 428A and secondary clutch 428B to engage with precision to facilitate the smooth floss operation without requiring excessive user effort. The primary clutch 428A is operatively engaged with the first worm 422A via the axle shaft 423. The primary clutch 428A is operates as the slip clutch, allowing controlled rotational slippage when light torque is applied. The flexible spring 432 is adapted to adjust the slip torque of the primary clutch 428A to maintain, thereby preventing rotational force from relocating to the first worm 422A. The user rotates the first worm 422A in at least one direction to control the first spool 418 to dispense fresh floss and collect the used floss by the second spool 424.

The first worm 422A provides smooth and controlled sliding motion along its support points, thereby maintaining the overall alignment and structural integrity of the hand-held dental flossing device 400. The hand-held dental flossing device 400 allows for a hassle-free user experience while ensuring the durability and proper functioning of the flossing mechanism. The flexible spring 432 applies a controlled force against the bushing member 430 on one side and the each of the primary clutch 428A and the secondary clutch 428B, effectively determining the slip torque level of the primary clutch 428A and the secondary clutch 428B. This slip torque level governs the engagement strength required for the dental floss 412 to transition smoothly between winding and unwinding states.

The secondary clutch 428B is equipped with the second spool 424. The second spool 424 ensures to rotate in a single direction to collect the used floss, while the first spool 418, equipped with the first clutch 428A and first worm 422A, is responsible for dispensing unused dental floss 412. The secondary clutch 428B is connected to the floating platform 414 at one end and the other end is connected to the second worm 422B. As the user rotates the second worm 422B, the secondary clutch 428B is adapted to permit the rotation of the second spool 424 in the single direction (clockwise from the user's perspective facing the hand-held dental flossing device 400), thereby winding used dental floss 412 and having little effect on dispensing from the first spool 418. The unidirectional rotation of both the first worm 422A and the second worm 422B ensures that no used dental floss 412 is back wound to the first spool 418, thereby maintaining proper alignment and hygienic operation.

TABLE 1

| First spool with worm | Second spool with worm | Operation |
| --- | --- | --- |
| Hold | Turn | Increase floss tension |
| Turn | Hold | Decrease floss tension |
| Turn (tandem) | Turn | Change floss in head |

In one embodiment herein, the hand-held dental flossing device 400 is integrated with the first spool 418 and the second spool 424, the first spool 418 is connected to the first worm 422A and the second spool 424 is connected to the second worm 422B, respectively. The secondary worm gear profile 426 is operatively engaged with the second worm 422B and rotate to increase the dental floss tension. This interaction facilitate to transfer rotational motion to the second spool 424 without significant back force due to the slip clutch mechanism. The secondary worm gear profile 426 ensures controlled floss dispensing and alignment. This arrangement enables precise control over the dental floss 412 tension and facilitates efficient replacement after use. The user enables to increase the dental floss 412 tension by holding the first spool 418 steadily while turning the second spool 424. This action tightens the dental floss 412.

The user enables to decrease the dental floss 412 tension by holding the second spool 424 while turning the first spool 418. This action loosen the dental floss 412 to reduce the tension. The primary worm gear profile 420 is operatively engaged with the first worm 422 and adapted to facilitate the dental floss 412 tension. The primary worm gear profile 420 handles precise adjustment and tension control. The each spool of the first spool 418 and the second spool 424 are essential for customizing the dental floss 412 tension based on the user requirement of oral care needs, thereby ensuring a comfortable and effective flossing experience.

The user needs to replace the dental floss 412 by turning the first spool 418 and the second spool 424 in tandem to ensure there is no clutch slippage during the operation. This synchronized motion retracts the dental floss 412 in the head 406 without affecting the pre-set tension, thereby allowing the user to replace used dental floss 412 with fresh dental floss quickly and efficiently. The user easily adjusts the tension and replacement of the dental floss 412 with minimal effort. The hand-held dental flossing device 400 enhances the operational reliability to the users with seamless tension adjustments and a smooth flossing experience with minimal effort.

Figure 13A:
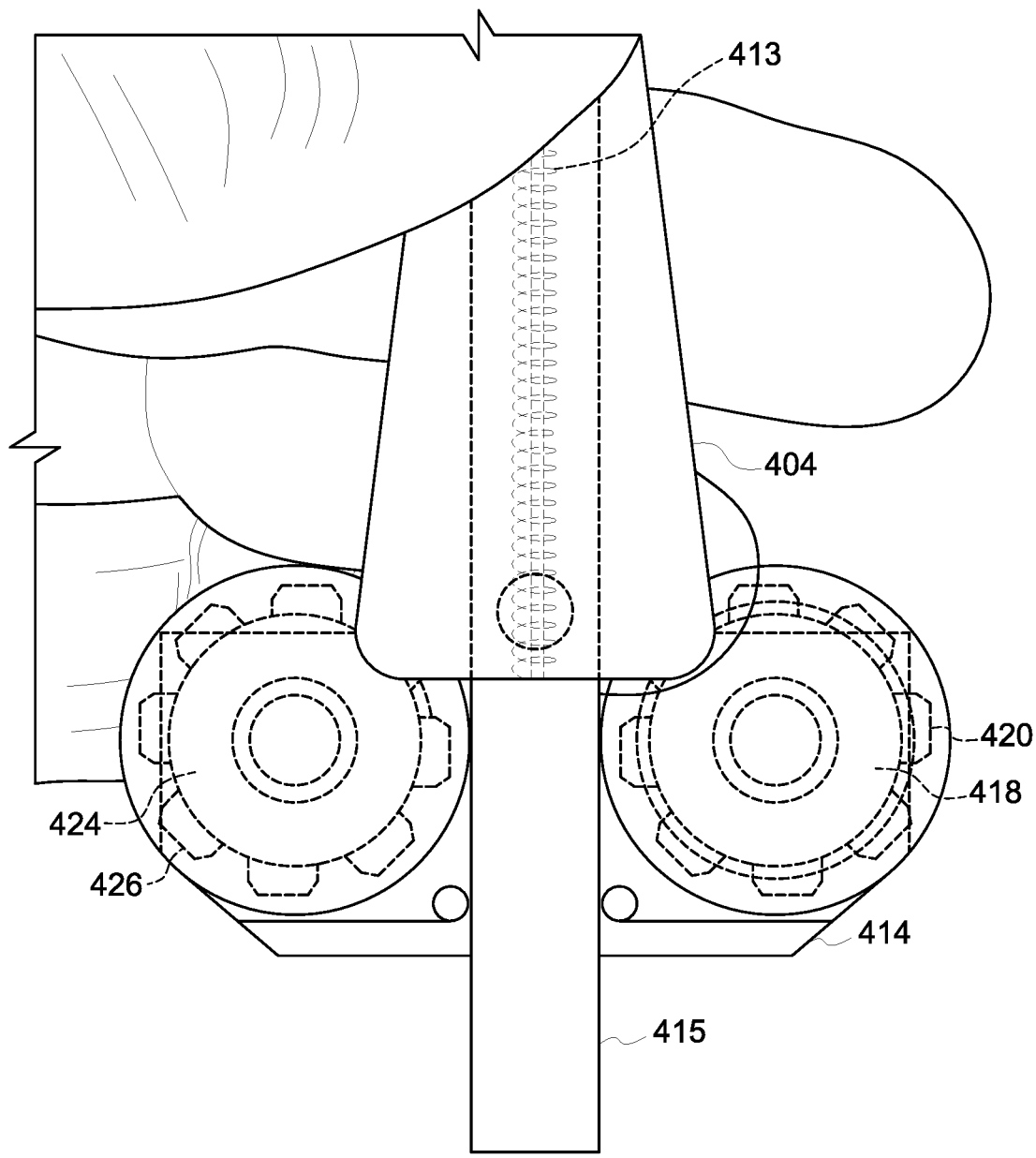
FIGS. 13A-13B illustrates perspective views of the hand-held dental flossing device operated by the user in order to adjust the tension of the dental floss, in accordance with embodiments of the invention.
Figure 13B:
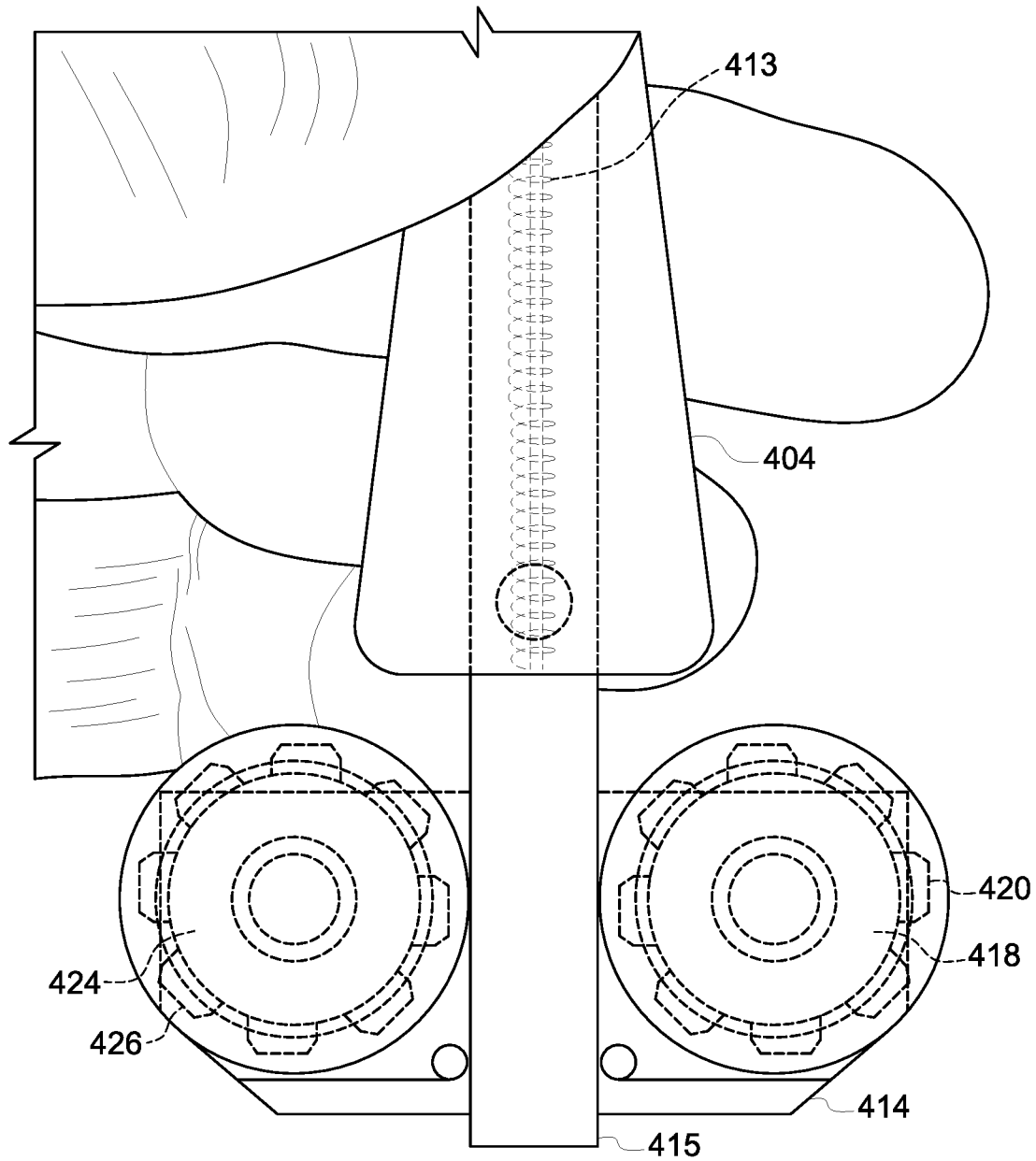

FIGS. 13A-13B refer to perspective views of the hand-held dental flossing device 400 operated by the user in order to adjust the tension of the dental floss 412. The hand-held dental flossing device 400 employs a two-stage tension mechanism to optimize the dental flossing process. The first stage is facilitated by the elastic member 413 integrated into the handle 404. The elastic member 413 are designed to maintain a baseline level of tension in the dental floss 412 while providing flexibility to adapt to varying user requirements. The non-linear nature of the elastic member 413 allows for progressive tension adjustment, thereby ensuring that the floss remains taut during use without excessive force.

In one embodiment herein, the second stage of the tension mechanism is achieved through the ergonomic interaction of the hand-held dental flossing device 400 with the user's hand. The hand-held dental flossing device 400 is allow the user to rests comfortably against the user's palm, while the fingers engage with the floating platform 414, which houses the first spool 418 and the second spool 424. When the user closes their fingers slightly, simulating the first spool 418, a pulling force is exerted on the floating platform 414. This action directly increases the tension of the dental floss 412 at the head 406, creating a surge in tension. This movement is advantageous when navigating the floss between tight spaces, such as between closely spaced teeth.

The movement of the floating platform 414 in response to the user's hand movements provides immediate tactile feedback, thereby allowing the user to sense and control the tension at the head 406. This real-time feedback enhances precision and comfort during dental flossing process, enabling users to adapt the floss tension dynamically for various flossing scenarios. This intuitive design ensures that the hand-held dental flossing device 400 is not only effective but also user-friendly.

Before initiating the flossing operation, the used needs to assess the dental floss 412 tension in the head 406. If the tension of the dental floss 412 is misaligned with their comfort by controlling dental floss 412 to either increase and decrease. This personalized adjustment ensures that the dental floss 412 remains effective and gentle on gums. The hand-held dental flossing device 400 facilitates smooth control and precise navigation of the floss between teeth, even in tight or challenging spaces.

If the dental floss 412 becomes worn and frayed during a session, the user can effortlessly replace it with fresh floss from the second spool 424. This process is made easy through the flosser's design, allowing the floss dental floss 412 replacement to be performed with just a single finger or thumb, ensuring the activity remains uninterrupted. Once the flossing operation is complete, the user should thoroughly rinse the hand-held dental flossing device 400 to remove any accumulated residue or debris. The open structure of the hand-held dental flossing device 400 supports easy cleaning. The hand-held dental flossing device 400 stored in a designated area, ready for the next use.

Figure 14:
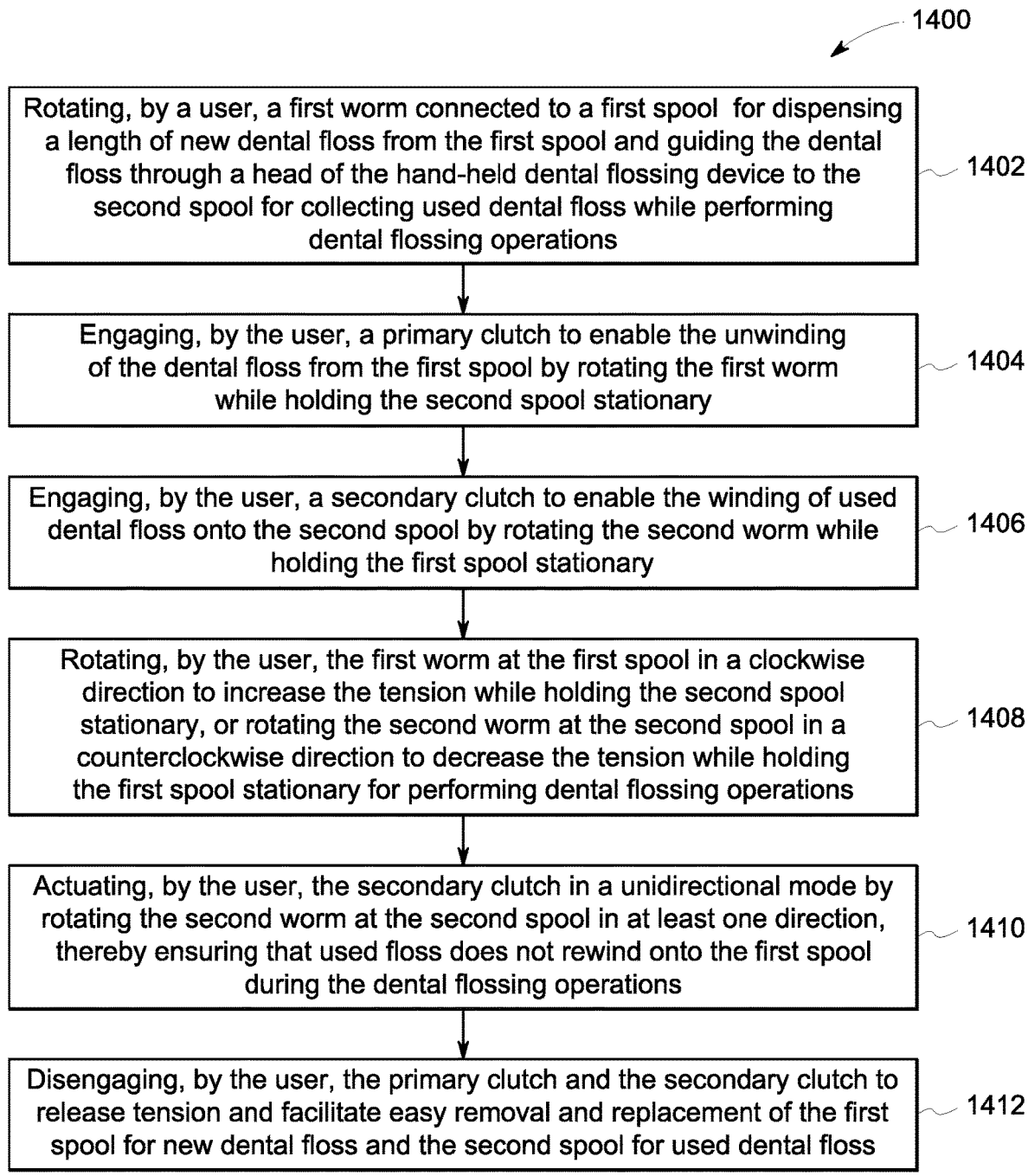
FIG. 14 illustrates a flowchart of a method for operating the hand-held dental flossing device, in accordance with embodiments of the invention.

FIG. 14 refers to a flowchart 1400 of a method for operating the hand-held dental flossing device 400. At step 1402, the user rotates the first worm 422A, which is mounted on the axle shaft 423 and connected to the first spool 418. This action dispenses a length of new dental floss 412 from the first spool 418. The dental floss 412 is guided through the plurality of arms 410, passing through the micro pulleys 408 at the head 406 of the hand-held dental flossing device 400, and is collected onto the second spool 424. This setup facilitates uninterrupted flossing during dental operations.

At step 1404, the user engages the primary clutch 428A. This engagement allows the unwinding of the dental floss 412 from the first spool 418 by rotating the first worm 422A, while the second worm 422B remains stationary, thereby ensuring precise floss dispensing and maintaining appropriate tension.

At step 1406, the user engages the secondary clutch 428B. This enables the winding of used dental floss 412 onto the second spool 424 by rotating the second worm 422B while keeping the first worm 422A stationary, effectively collecting the used dental floss 412.

At step 1408, the user adjusts the floss tension at the head 406 for optimal performance by rotating the first worm 422A at the first spool 418 in the clockwise direction (from the user's perspective facing the hand-held dental flossing device 400) to decrease the tension of the dental floss 412 while holding the second worm 422B stationary, or rotating the second worm 422B at the second spool 424 in the clockwise direction to increase the tension of the dental floss 412 while holding the first worm 422A stationary. The floating platform 414, which is movably positioned within the handle 404 via the holding member 415, flexibly adjusts under the influence of the flexible spring 432 and the elastic member 413, facilitating smooth tension control. Both the first worm 422A and the second worm 422B share a common axle, and when the pair of clutches (428A, 428B) are not slipping, both the first worm 422A and the second worm 422B turn in tandem in the same clockwise direction, with the first spool 418 dispensing the dental floss 412 and the second spool 424 collecting the dental floss 412.

At step 1410, the user actuates the secondary clutch 428B to facilitate rotation by rotating the second worm 422B at the second spool 424 in one direction. The unidirectional control, independent of the clutch action, restricts the first spool 418 and the second spool 424 to rotate only in the clockwise direction from the user's perspective facing the hand-held dental flossing device 400, thereby ensuring that the used dental floss 412 does not rewind back onto the first spool 418, thereby maintaining hygienic operation and preventing floss tangling during use.

Finally, at step 1412, the user relaxes the tension of the dental floss 412 by holding the second worm 422B until enough dental floss 412 is dispensed to bring the tension to zero, as the primary clutch 428A and the secondary clutch 428B slip under controlled conditions. If the first spool 418 is empty, the user must cut the dental floss 412 to relax the elastic member 413, thereby enabling the elastic member 413 to return to its relaxed state. This facilitates the easy removal and replacement of the first spool 418 for new dental floss and the second spool 424 for used dental floss. Additionally, the scale 434 on the handle 404 aids the user in precise floss tension adjustments for improved convenience and functionality.

Modifications and improvements of the present invention will be apparent to those skilled in the art. For example, the handle 404 can be split into one or more supporting members, thereby allowing the user to hold and grip the hand-held dental flossing device 400 during flossing of the teeth. The dental floss 412 could be any material made of nylon, polytetrafluoroethylene (PFTE), silk, or any other material and selected based on the user preference.

In one embodiment herein, particularly in the split handle configuration, the entire floating platform 414 may be detachably mounted to the handle 404 and removed in its entirety when the elastic member 413 is in its relaxed state. This configuration facilitates the straightforward replacement of both the first spool 418 and the second spool 424, along with their associated components, thereby streamlining the reloading process.

Unlike other embodiments, such as the worm and worm gear configuration or the straight handle design, where only the spools or a partial cartridge are replaced, the split handle design necessitates the floating platform 414 exchange due to structural constraints and the integration of multiple components within the floating platform 414.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principles of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

It will readily be apparent that numerous modifications and alterations can be made to the processes described in the foregoing examples without departing from the principles underlying the invention, and all such modifications and alterations are intended to be embraced by this application.

The claimed invention is:

1. A hand-held dental flossing device, comprising:

a body having a handle, said handle having a split or solid structure at one end and a palm rest at another end, which are configured for providing an ergonomic grip for a user to secure the hand-held dental flossing device through at least one hand during dental flossing operations;

a head with a plurality of arms securely affixed to one end of said handle, wherein at least one arm of said plurality of arms comprises one or more closed loops, which are configured to facilitate the passage of a dental floss, which is used for flossing teeth during the dental flossing operations;

a floating platform having a holding member configured to slidably position within said handle, wherein said floating platform comprises:

a case member defining a chamber;

a first spool with a dental floss rotatably mounted within said chamber, wherein said first spool comprises a primary worm gear profile, which is configured to engage with a first worm, that is rotatably mounted on one side of an axle shaft protruding outward through the handle, and rotated manually by a user for unwinding of the dental floss;

a second spool configured to receive used dental floss and having a secondary worm gear profile, wherein said second spool is rotatably mounted within said chamber and adapted to engage with a second worm for winding the used dental floss back onto the second spool, wherein the second worm is rotatably mounted on another side of the axle shaft;

a pair of clutches mounted on the axle shaft on both sides while aligning with the first worm and the second worm, wherein each of the pair of clutches comprises:

a primary clutch connected to the first spool via the first worm for enabling the unwinding of new dental floss when engaged;

a secondary clutch connected to the second spool via the second worm for enabling the winding of used dental floss when engaged; and at least one flexible spring positioned over the axle shaft on both sides, thereby positioning between the primary clutch and a bushing member affixed to one end of the first worm, and between the secondary clutch and another bushing member affixed to one end of the second worm, thereby exerting a restoring force to facilitate controlled engagement of the pair of clutches and enabling controlled slipping under predetermined torque conditions, and enabling the user to independently control the rotation of the first spool and the second spool while rotating the first worm and the second worm, respectively, wherein said floating platform is adapted to move through said handle towards said head against an elastic member, wherein the elastic member is flexibly mounted within said handle and is configured such that the user either decreases the tension of the dental floss at said head by rotating said first worm at the first spool in a clockwise direction while holding the second worm stationary at said second spool, or increases the tension and by rotating the second worm at said second spool in the clockwise direction while holding the first worm stationary at said first spool.

2. The hand-held dental flossing device of claim 1, wherein the primary clutch and the secondary clutch are adapted to facilitate tension release by slipping under controlled conditions when the user rotates the first worm and the second worm, thereby facilitating easy removal and replacement of the first spool and the second spool, and wherein the second clutch is configured to be operated in a unidirectional mode to prevent a reverse rotation of the used dental floss to wind back onto the first spool.

3. The hand-held dental flossing device of claim 1, wherein the floating platform is configured to be detachable from the handle, thereby allowing for easy loading and replacement of the first spool and the second spool by removing the entire floating platform in the relaxed state of the elastic member.

4. The hand-held dental flossing device of claim 1, wherein the first spool and the second spool are mounted horizontally to reduce the overall profile of the hand-held dental flossing device, thereby enhancing user comfort by enabling a more secure grip, optimizing the path of the dental floss, and ensuring smoother operation.

5. The hand-held dental flossing device of claim 1, wherein the hand-held dental flossing device comprises low-friction micro-pulleys mounted at critical bend points near the head, which minimize friction during dental flossing and maintain consistent tension of the dental floss, even with thicker and waxed dental floss types.

6. The hand-held dental flossing device of claim 1, wherein said handle includes a scale for facilitating the user to set and adjust the tension of the dental floss precisely, with distinct levels for minimum, nominal, and maximum tension to accommodate different flossing preferences.

7. The hand-held dental flossing device of claim 1, wherein said head has an angle that allows for easy maneuverability in hard-to-reach areas of the mouth.

8. The hand-held dental flossing device of claim 1, wherein said floating platform incorporates bank winding techniques to reduce variation in the dental floss load across the first spool and the second spool, thereby maintaining consistent dental floss tension and preventing errors caused by varying spool diameters, and
   wherein the floating platform is configured to allow the user to adjust the tension of the dental floss by manipulating the handle and engaging the elastic member.

9. The hand-held dental flossing device of claim 1, wherein the first spool and the second spool are configured to rotate in the same directions, with rotation defined as clockwise from the user's perspective facing the hand-held dental flossing device, thereby facilitating simultaneous winding and unwinding of the dental floss for performing the dental flossing operations efficiently.

10. The hand-held dental flossing device of claim 1, wherein the pair of clutches are slipper clutches, which is are used to limit rotational motion of at least one of said first spool or said second spool in a direction while setting the tension of said dental floss.

11. The hand-held dental flossing device of claim 1, wherein said floating platform is detachably positioned to said handle, thereby allowing the user to simply load and replace said first spool with the dental floss and said second spool by removing the entire floating platform in the relaxed state of the elastic member.

12. The hand-held dental flossing device of claim 1, wherein said plurality of arms is made of at least one material including stainless-steel, wherein said plurality of arms is coated with silicone, which provides comfort to the user during the flossing of teeth.

13. The hand-held dental flossing device of claim 1, wherein the elastic member is configured to provide and maintain constant tension of the floss at said head of said hand-held dental flossing device, thereby preventing tangling of the dental floss, wherein said elastic members is a non-linear spring.

14. A method for operating a hand-held dental flossing device, comprising:
   rotating, by a user, a first worm connected to a first spool for dispensing a length of new dental floss from the first spool and guiding the dental floss through a head of the hand-held dental flossing device to a second spool for collecting used dental floss while performing dental flossing operations;
   engaging, by the user, a primary clutch to enable the unwinding of the dental floss from the first spool by rotating the first worm while holding the second worm stationary;
   engaging, by the user, a secondary clutch to enable the winding of used dental floss onto the second spool by rotating a second worm while holding the first worm stationary;
   rotating, by the user, the first worm at the first spool in a clockwise direction to decrease the tension while holding the second worm stationary, or rotating the second worm at the second spool in the clockwise direction to increase the tension while holding the first worm stationary for performing dental flossing operations;
   actuating, by the user, the secondary clutch to facilitate rotation in a unidirectional mode by rotating the second worm at the second spool in only one direction, thereby ensuring that used floss does not rewind onto the first spool during the dental flossing operations; and
   holding, by the user, the second worm until enough dental floss is dispensed, thereby releasing tension of the dental floss as the primary clutch and the secondary clutch slip under controlled conditions and facilitating easy removal and replacement of the first spool for new dental floss and the second spool for used dental floss.

* * * * *